United States Patent
Rimon et al.

(10) Patent No.: US 8,289,289 B2
(45) Date of Patent: Oct. 16, 2012

(54) MULTI-TOUCH AND SINGLE TOUCH DETECTION

(75) Inventors: Ori Rimon, Tel-Aviv (IL); Haim Perski, Hod-HaSharon (IL); Amihai Ben-David, Caesarea (IL); Rafi Zachut, Rishon-LeZion (IL)

(73) Assignee: N-trig, Ltd., Kfar-Saba (IL)

( * ) Notice: Subject to any disclaimer, the term of this patent is extended or adjusted under 35 U.S.C. 154(b) by 671 days.

(21) Appl. No.: 12/417,062

(22) Filed: Apr. 2, 2009

(65) Prior Publication Data

US 2009/0251434 A1 Oct. 8, 2009

Related U.S. Application Data

(60) Provisional application No. 61/064,919, filed on Apr. 3, 2008.

(51) Int. Cl.
*G06F 3/041* (2006.01)
(52) U.S. Cl. .................................. 345/173; 178/18.01
(58) Field of Classification Search .................. None
See application file for complete search history.

(56) References Cited

U.S. PATENT DOCUMENTS

| | | | |
|---|---|---|---|
| 6,690,156 B1 | 2/2004 | Weiner et al. | |
| 6,762,752 B2 | 7/2004 | Perski et al. | |
| 7,292,229 B2 | 11/2007 | Morag et al. | |
| 7,372,455 B2 | 5/2008 | Perski et al. | |
| 2007/0062852 A1 | 3/2007 | Zachut et al. | |
| 2007/0262964 A1* | 11/2007 | Zotov et al. | 345/173 |
| 2009/0228828 A1* | 9/2009 | Beatty et al. | 715/786 |
| 2009/0231281 A1* | 9/2009 | Whytock et al. | 345/168 |

FOREIGN PATENT DOCUMENTS

JP 2002-342033 11/2002

OTHER PUBLICATIONS

U.S. Appl. No. 12/265,819, filed Nov. 8, 2008, Rimon et al.
Rekimoto "SmartSkin: An Infrastructure for Freehand Manipulation on Interactive Surfaces", CHI 2002, Minneapolis, Minnesota, USA, Apr. 20-25, 2002, 4(1): 113-120, 2002.

* cited by examiner

*Primary Examiner* — Andrew L Sniezek

(57) ABSTRACT

An input device comprises a touch sensitive sensor operative to sense finger touch, a detection unit controllable to apply a single touch detection method over at least one area of the touch sensitive sensor and a multi-touch detection method over at least one other area of same touch sensitive sensor, and a controller operative to set the areas of single touch and multi-touch detection.

26 Claims, 15 Drawing Sheets

MULTI-TOUCH AND SINGLE TOUCH DETECTION

RELATED APPLICATION/S

The present application claims the benefit under 35 U.S.C. §119(e) of U.S. Provisional Application No. 61/064,919, filed on Apr. 3, 2008 which is incorporated herein by reference in its entirety.

FIELD OF THE INVENTION

The present invention, in some embodiments thereof, relates to touch sensitive computing systems and more particularly, but not exclusively to multi-touch sensitive computing systems.

BACKGROUND OF THE INVENTION

Digitizing system and touch sensitive screens that allow a user to operate a computing device with a finger and/or stylus are known. Typically, a digitizer is integrated with a display screen, e.g. over-laid on the display screen, to correlate user input, e.g. finger touch and/or stylus interaction on the screen with the virtual information portrayed on display screen. Position detection of the fingers and/or stylus detected provides input to the computing device and is interpreted as user commands.

U.S. Pat. No. 6,690,156 entitled "Physical Object Location Apparatus and Method and a Platform using the same" and U.S. Pat. No. 7,292,229 entitled "Transparent Digitizer" both of which are assigned to N-trig Ltd., the contents of both which are incorporated herein by reference, describe a positioning device capable of locating multiple physical objects positioned on a Flat Panel Display (FPD) and a transparent digitizer sensor that can be incorporated into an electronic device, typically over an active display screen of the electronic device. The digitizer sensor includes a matrix of vertical and horizontal conductive lines to sense an electric signal. Typically, the matrix is formed from conductive lines patterned on two transparent foils that are superimposed on each other. Positioning the physical object at a specific location on the digitizer provokes a signal whose position of origin may be detected.

U.S. Pat. No. 6,762,752 entitled "Dual Function Input Device and Method" assigned to N-Trig Ltd., the contents of which is incorporated herein by reference, describes an apparatus for user input to a digital system, comprising a first sensing system for sensing a user interaction of a first type, co-located with a second sensing system for sensing a user interaction of a second type. The first system may detect styluses and like objects using EM radiation and the second system may detect touch pressure. In one embodiment, touch detection is extended only to the lower part of the screen, in which the keyboard is likely to be located, whereas stylus sensing extends to the entire screen. It is described that such an embodiment leads to a reduction in the number of parts, and thus reduced cost coupled with greater reliability.

U.S. Pat. No. 7,372,455, entitled "Touch Detection for a Digitizer" assigned to N-Trig Ltd., the contents of which is incorporated herein by reference, describes a digitizing tablet system including a transparent digitizer sensor overlaid on a FPD. The transparent digitizing sensor includes a matrix of vertical and horizontal conductive lines to sense an electric signal. Touching the digitizer in a specific location provokes a signal whose position of origin may be detected. The digitizing tablet system is capable of detecting position of multiple physical objects and fingertip touches using same conductive lines.

US Patent Application Publication No. 20070062852, entitled "Apparatus for Object Information Detection and Methods of Using Same" assigned to N-Trig Ltd., the contents of which is incorporated herein by reference, describes a digitizer sensor and/or touch screen sensitive to capacitive coupling and objects adapted to create a capacitive coupling with the sensor when a signal is input to the sensor. In some embodiments, the digitizer sensor includes a series of activated electrodes and passive electrodes. An AC signal, e.g. a pulsed AC signal, sequentially activates each of the activated electrodes. In response to each AC signal applied, a signal is transferred, by capacitive coupling, to each of the passive electrodes. The presence of a finger or an object typically alters the signal transferred to some of the passive electrodes. In some exemplary embodiments described in this reference, to speed up report rate, the active electrodes are divided into a number of groups wherein the active electrodes in each group are activated sequentially but the groups work simultaneously. This is accomplished by applying AC signals with non-mutually interfering (orthogonal) frequencies to each of the groups working simultaneously.

SUMMARY OF THE INVENTION

According to an aspect of some embodiments of the present invention there is provided a touch detection system and method for selectively applying a first touch detection method over a first selected part of a touch sensitive sensor and a second touch detection method over a second selected part of the same touch sensitive sensor. According to some embodiments of the present invention, the first detection method provides for single touch detection and the second touch detection methods provides for multi-touch detection. According to some embodiments, positions and sizes of the first and second selected parts of the touch sensitive sensor are set in accordance with the application being used or dynamically defined or changed during operation of the application.

As used herein multi-touch (sometimes referred to as multi-point) detection method refers to detection method capable of detecting input obtained with at least two same user interactions simultaneously interacting with a digitizer sensor, e.g. at two different locations on the digitizer. Multi-point and/or multi-touch detection may include detection of interaction with the digitizer sensor by touch and/or hovering.

As used herein single-point and/or single touch detection, refers to a detection method configured for unambiguously locating different user interactions simultaneously interacting with the digitizer sensor.

As used herein, like and/or same user interactions are user interactions that invoke like signals on the digitizer sensor, e.g. two or more fingers altering a signal in a like manner or two or more stylus' that transmit at a same or similar frequency. As used herein, different user interactions are user interactions that invoke signals that can be differentiated from each other.

As used herein single touch detection (sometimes referred to as single point) is not configured for unambiguously locating same or like user interactions simultaneously interacting with the digitizer sensor. With single touch detection, multiple simultaneous interactions may at times not be unambiguously localized.

An aspect of some embodiments of the present invention provides for an input device comprising: a touch sensitive sensor operative to sense finger touch; a detection unit controllable to apply a single touch detection method over at least one area of the touch sensitive sensor and a multi-touch detection method over at least one other area of same touch sensitive sensor; and a controller operative to set the areas of single touch and multi-touch detection.

Optionally, the different areas partially overlap.

Optionally, the controller is operative to dynamically set the areas of single touch and multi-touch detection.

Optionally, the at least one area is defined based on requirements of an application running on a host associated with the touch sensitive sensor.

Optionally, the detection unit is operative to apply the multi-touch detection method over a plurality of different areas.

Optionally, a refresh rate associated with the touch sensitive sensor is responsive of a size of the area where the multi-touch method is applied and wherein limiting size of the area where the multi-touch method is applied provides for increasing the refresh rate of the input device.

Optionally, the at least one area detected based on the multi-touch detection method is sampled at a lower resolution than the at least one area detected based on the single touch detection method.

Optionally, the touch sensitive sensor is formed with a plurality of conductive lines formed in a grid.

Optionally, at least one of the conductive lines spans at least two areas where different detection methods are applied.

Optionally, the single touch detection method is based on detecting a difference signal between parallel conductive lines of the grid.

Optionally, the detection unit is operative to simultaneously trigger and sample the conductive lines over the single touch detection area.

Optionally, the detection unit is operative to sequentially trigger conductive lines along one axis of the grid over the multi-touch detection area.

Optionally, the detection unit is operative to sample conductive lines within the multi-touch detection area in response to each trigger.

Optionally, the controller is operative to provide for sampling output from a same conductive line over a first period based on the single touch detection method and over a second period based on the multi-touch detection method.

Optionally, the detection unit is operative to switch to an alternate circuit path during the second sampling period.

Optionally, the controller is operative to provide for sampling every other conductive line in a multi-touch detection area over a first sampling cycle and to sample all lines not sampled in the first sampling cycle during a subsequent sampling cycle.

Optionally, during a single sampling cycle, the controller is operative to provide for first sampling the touch sensitive sensor based on the single touch detection method and subsequently sampling an area applied for multi-touch detection based on the multi-touch detection method.

Optionally, the touch sensitive sensor provides for detecting stylus input in at least one of the detection areas.

Optionally, the input device provides for sampling touch and stylus signals on the conductive lines substantially simultaneously.

Optionally, the different detection methods are associated with different triggering or interrogation frequencies.

Optionally, the single touch and multi-touch areas area are sampled substantially simultaneously.

An aspect of some embodiments of the present invention provides for a method for touch detection, the method comprising: controllably setting at least one multi-touch detection area on a touch sensitive sensor for applying multi-touch detection; applying multi-touch detection only in the defined at least one multi-touch detection area; applying single touch detection in at least areas of the touch sensitive screen other than the at least one multi-touch detection area; and detecting touch over each of the defined areas.

Optionally, the at least one multi-touch detection area and the areas where single touch detection is applied, partially overlap.

Optionally, the setting is performed dynamically.

Optionally, the touch sensitive sensor is formed with conductive lines formed in a grid.

Optionally, in the areas where the single touch detection is applied, the conductive lines are triggered and sampled substantially simultaneously.

Optionally, in the at least one multi-touch detection area, conductive lines along one axis of the grid are triggered in sequence and in response to each triggering, conductive lines in a cross axis are sampled.

Optionally, the method comprises detecting stylus input in the at least one multi-touch detection area.

Optionally, stylus output signals and finger touch output signals area detected substantially simultaneously in the at least one multi-touch detection area.

Optionally, the method comprises sampling the at least one area where single touch detection is applied over a first sampling period and subsequently sampling the at least one multi-touch detection area over a second sampling period, wherein the first and second sampling period are included in a single sampling cycle.

Optionally, sampling output from the at least one multi-touch detection area at a lower resolution as compared to sampled output in the areas where single touch detection is applied.

An aspect of some embodiments of the present invention provides for an input device comprising: a touch sensitive sensor operative to sense finger touch; a detection unit controllable to apply a first touch detection method over at least one area of the touch sensitive sensor and a second detection method over at least one other area of same touch sensitive sensor; and a controller operative to set the areas of the first touch and second detection method.

Optionally, the different areas partially overlap.

Optionally, at least one of the areas is dynamically defined.

Optionally, during a single sampling cycle, the controller is operative to sample at least a portion of the touch sensitive sensor based on the first touch detection method and subsequently sample at least another portion of the touch sensitive sensor based on the second touch detection method.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1:
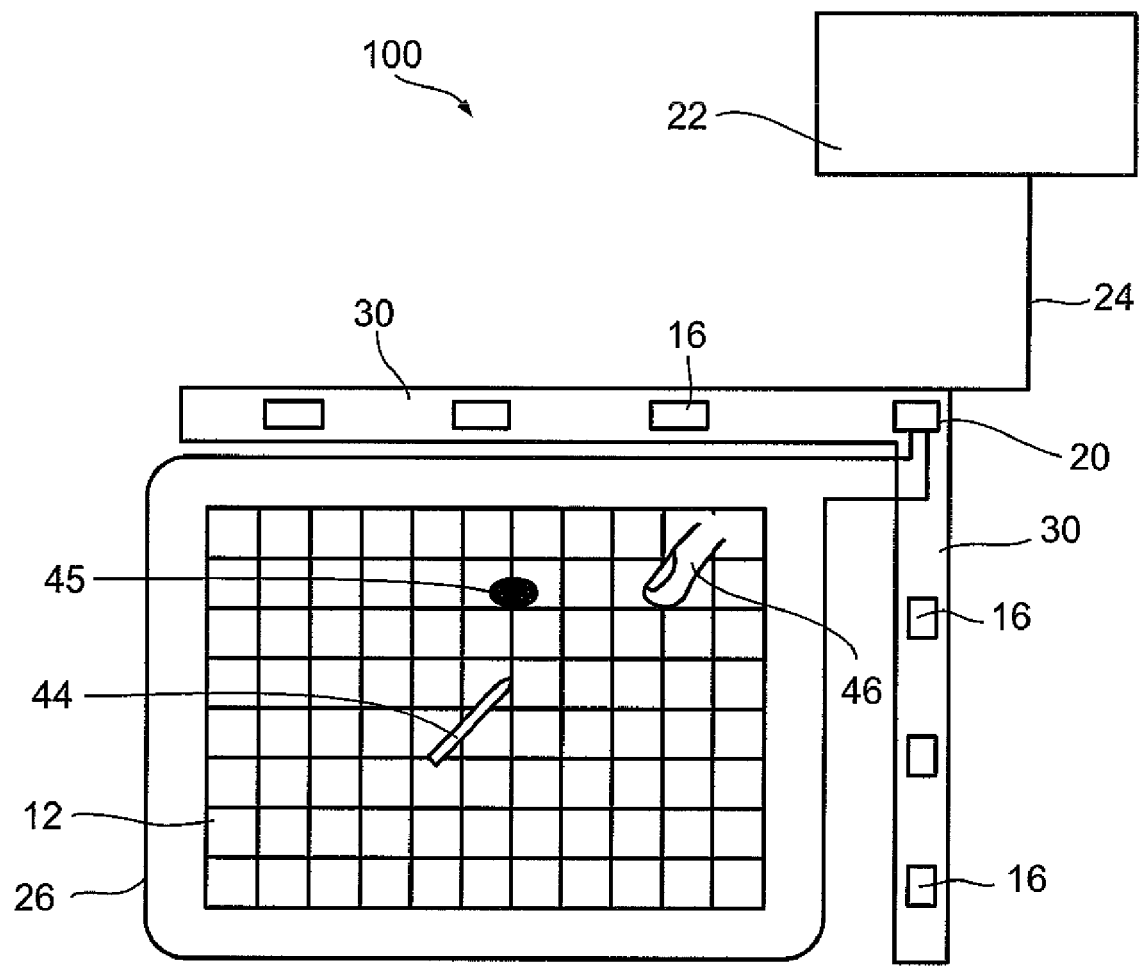
FIG. 1 is an exemplary simplified block diagram of a digitizer system in accordance with some embodiments of the present invention.

The present invention, in some embodiments thereof, relates to touch sensitive computing systems and more particularly, but not exclusively to multi-touch sensitive computing systems.

An aspect of some embodiments of the present invention provides selectively implementing more than one detection method for detecting touch with a touch sensitive digitizing system. According to some embodiments of the present invention, the different detection methods include a single touch detection method and a multi-touch detection method.

The present inventors have found that both the single touch detection method and the multi-touch detection method can be implemented on the same touch sensitive screen using the same sensor.

According to some embodiments of the present invention, the digitizing system includes a grid based sensor for sensing touch on a touch sensitive screen. Typically, the grid based sensor includes a first array of conductive lines oriented in one direction and a second array of conductive lines oriented in a second direction so as to form a grid spanning the detection area of the screen. According to some embodiments of the present invention, different circuitry and/or a different circuit path is applied for each of the different detection methods to detect touch from the grid based sensor. According to some embodiments of the present invention, different triggering or interrogation methods are applied for each of the detection methods. According to some embodiments, during implementation of a single touch detection method, at least one pair of parallel conductive lines is concurrently interrogated and a difference in signal output of the interrogated lines is sampled. In some exemplary embodiments, during implementation of a multi-touch detection method, one line is triggered (or a plurality of lines are consecutively triggered) and signal output on all relevant cross lines are sampled.

Typically, the single touch detection method is more economical in terms of processing requirements and overall sampling and interrogating time since all the conductive lines in the sensor can be concurrently interrogated and sampled. According to some embodiments of the present invention, multi-touch detection requires consecutively triggering lines oriented in one direction and sampling all cross-lines of interest in response to each trigger event, e.g. triggered line. Typically, the sampling of all cross-lines of interest in response to each trigger event is performed simultaneously.

Typically, an update and/or refresh rate used for multi touch detection method is lower than the update rate used for single touch detection since multi-touch detection requires more time to interrogate and/or trigger all the sensor lines as compared to the interrogating and/or triggering time required for single touch detection. As used herein update rate and/or refresh rate is the rate at which sensor output is sampled and/or the rate at which interaction positions are reported to a host.

According to some embodiments of the present invention, the different detection methods are applied to different areas on the touch sensitive sensor. According to some embodiments of the present invention, the areas are set by a software application. As used herein an area that is set can either be maintained for the duration of the time the application is running or may be dynamic and change during the course of the application. According to some embodiments of the present invention, the areas are defined by a software application that is running on the host. In some exemplary embodiments, one or more areas may be statically defined (unchanged) for a particular application, but may be changed for different applications, by the application. In some exemplary embodiments, one or more areas, e.g. pre-defined areas may be dynamically defined, e.g. altered based on application needs, as the operation of the application unfolds. According to some embodiments of the present invention, one or more areas include indication operative to indicate to the user a detection mode and/or method applied to a particular area. As used herein a detection mode is one of single touch detection mode and multi-touch detection mode. In some exemplary embodiments, the pre-defined areas and associated detection methods are transparent to the user.

According to some embodiments of the present invention, pre-defined areas designated for applying different detection methods include common conductive lines. For example, at any one time part of a conductive line associated with one pre-defined area may be used to detect touch using one detection method while another part of the same line associated with another pre-defined area is used to detect touch using an alternate detection method. According to some embodiments of the present invention, interference is prevented by avoiding concurrent user interaction in pre-defined areas that interfere with each other. Typically, this can be avoided by software application design so that concurrent user interaction in potentially interfering areas is not required by the application. In some exemplary embodiments, when the user concurrently interacts in a multi-touch and single touch area, ambiguity can be resolved by first determining interaction positions in a multi-touch area and using knowledge of the positions to resolve ambiguity as to an interaction position in a single touch area.

According to some embodiments of the present invention, concurrent user interaction over a plurality of pre-defined areas using different detection methods is provided. In some exemplary embodiments, concurrent detection is provided by associating a unique frequency to each interfering detection method. Based on the frequency content of the output signals detected input obtained from each of the different detection methods can be decomposed.

According to some embodiments of the present invention, during each refresh period of the touch sensitive screen, each of the detection methods are applied in turn over at least their associated area. For example, in an application including one single touch area and one multi-touch area, during each refresh period, a single touch detection method will be applied to detect user input over single touch area. Following the single touch detection, a multi-touch detection method will be applied to detect user input over the multi-touch area. At the termination of both detections, the touch screen will be refreshed.

According to some embodiments of the present invention, the digitizer sensor is concurrently triggered, interrogated and/or sampled based on different detection methods. In some exemplary embodiments, concurrent detection is provided by using a unique frequency for each detection method and/or for each pre-defined area.

According to some embodiments of the present invention, different detection methods are refreshed at different rates (or frequencies). In one exemplary embodiment, a single touch detection area is refreshed more frequently than a multi-touch detection area. According to some embodiments of the present invention, different detection methods detect interaction with different detection resolutions. In one exemplary embodiment, detection resolution in a multi touch detection area is lower than the resolution in a single touch detection area. Typically, lower resolution occurs when fewer than all the lines within a defined area are sampled, e.g. every other line is sampled. In some exemplary embodiments, lower resolution is provided by triggering every other line on the triggering axis.

According to some embodiments of the present invention, stylus detection is available over the entire screen while single touch detection and multi-touch detection is applied to separately defined areas of the touch sensitive screen. Typically, for stylus detection a difference in signal output of the interrogated lines is detected while in multi-touch signal output of individual lines are detected. According to some embodiments of the present invention, concurrent detection, e.g. sampling of both stylus and touch in a multi-touch area is provided by applying circuitry dedicated for stylus detection and circuitry dedicated for multi-touch detection to each of the lines in at least the multi-touch area. According to some embodiments of the present invention, a stylus interaction is detected based on sampling output from stylus dedicated circuitry and concurrently finger touch interaction is detected based on sampling output from multi-touch dedicated circuitry.

According to some embodiments of the present invention, the touch sensitive digitizer system provides for dynamically switching detection methods, e.g. switching between different detection methods applied over the entire detection area of the touch sensitive sensor, or parts of it. Selection of the detection method may be initiated by a user, the digitizer system, and/or the host. For example, based on a current application running on the host, a user may be instructed to select an appropriate detection method. In some exemplary embodiments, a user selects a detection method and/or initiates a change in a detection method by activating a selection switch, e.g. a virtual switch or a physical switch on the sensor to select a detection method. In some exemplary embodiments, selection of a detection method may be based on a user command communicated via user interaction with the host, e.g. via a keyboard, mouse, or touch sensitive screen. In some exemplary embodiments, selection of a detection method is based on a command initiated directly from the software application with or without confirmation by the user.

According to some embodiments of the present invention, selection and/or switching the detection method are initiated in response to power level currently available to the system. In some exemplary embodiments, in response to the digitizer and/or the host sensing a reduction of power, e.g. battery power, below a pre-defined level, the host and/or digitizer initiates switching from a multi-touch detection method to single touch detection. In some exemplary embodiments, in response to the digitizer and/or the host sensing available power, e.g. due to AC connection and/or switching of batteries, above a pre-defined level, the host and/or digitizer initiates switching from single touch detection to multi-touch detection and/or initiates switching from single touch detection a combination of multi-touch and single touch detection, for example, when available power and/or battery life is limited.

Reference is now made to FIG. 1 showing an exemplary simplified block diagram of a digitizer system in accordance with some embodiments of the present invention. The digitizer system 100 shown in FIG. 1 may be suitable for any computing device that enables interactions between a user and the device, e.g. mobile computing devices that include, for example, FPD screens. Examples of such devices include Tablet PCs, pen enabled lap-top computers, PDAs or any hand held devices such as palm pilots and mobile phones. According to some embodiments of the present invention, the digitizer system is operative to detect multiple inputs from one or more stylus(es) 44, finger(s) 46 and/or a conductive object(s) 45. According to some embodiments of the present invention, the digitizer system comprises a sensor 12 including a patterned arrangement of conductive lines, which is optionally transparent, and which is typically overlaid on a FPD 10. Typically sensor 12 is a grid based sensor including horizontal and vertical conductive lines.

An ASIC 16 comprises circuitry to process and sample the sensor's output into a digital representation. The digital output signal is forwarded to a digital unit 20, e.g. digital ASIC unit, for further digital processing. According to some embodiments of the present invention, digital unit 20 together with ASIC 16 serves as the controller of the digitizer system and/or has functionality of a controller and/or processor. According to some embodiments of the present invention, ASICs 16 operate as a detection unit for processing and sampling the sensor's output. The outcome, once determined, is forwarded to a host 22 via an interface 24 for processing by the operating system or any current application. According to some embodiments of the present invention, control functionality is additionally or exclusively included in the host 22. ASIC 16 and digital unit 20 may be provided as a single ASIC. According to some embodiments of the present invention, sensor 12 comprises a grid of conductive lines made of conductive materials, optionally Indium Tin Oxide (ITO), patterned on a foil or glass substrate. The conductive lines and the foil are optionally transparent. Typically, the grid is made of two layers, which are electrically separated from each other. Typically, one of the layers contains a set of equally spaced parallel conductors and the other layer contains a set of equally spaced parallel conductors orthogonal to the set of the first layer. Typically, the parallel conductors are equally spaced straight lines, and are input to amplifiers included in ASIC 16. Optionally the amplifiers are differential amplifiers. Typically, the parallel conductors are spaced at a distance of approximately 2-8 mm, e.g. 4 mm, optionally depending on the size of the FPD and a desired resolution. Optionally, the region between the grid lines is filled with a non-conducting material having optical characteristics similar to the conductive lines, to mask the presence of the conductive lines.

Typically, ASIC 16 is connected to outputs of the various conductive lines in the grid and functions to process the received signals at a first processing stage. As indicated above, ASIC 16 typically includes one or more arrays of amplifiers, e.g. an array of differential amplifiers, an array of single ended amplifiers, or an array of differential amplifier optionally including one grounded input to amplify the sensor's signals. In some exemplary embodiments, the grounding input is selected by ASIC 16. Additionally, ASIC 16 optionally includes one or more filters to remove irrelevant frequencies. Optionally, filtering is performed prior to sampling. The signal is then sampled by an A/D, optionally filtered by a digital filter and forwarded to digital ASIC unit, for further digital processing. Alternatively, the optional filtering is fully digital or fully analog.

According to some embodiments of the invention, digital unit 20 receives the sampled data from ASIC 16, reads the sampled data, processes it and determines and/or tracks the position of physical objects, such as stylus, and/or finger, touching the digitizer sensor. According to some embodiments of the present invention hovering of an object, e.g. stylus, finger and hand, is also detected and processed by digital unit 20. Calculated position is sent to the host computer via interface 24.

In some exemplary embodiment, the digitizer system 100 has several channels, i.e. interfaces included within interface 24, with the host computer. In an exemplary embodiment, a stylus interface is provided for transmitting stylus coordinates on the display screen and finger touch interface is provided for transmitting finger touch coordinates on the display screen. In some exemplary embodiments, finger touch coordinates based on both single touch detection method and multi-touch detection method is transmitted on a same interface. In some exemplary embodiments, separate interfaces are provided for each of the single touch and multi-touch detection methods. According to some embodiments of the present invention, the finger touch interface is referred as single-touch interface and an additional interface is provided for transmitting multi-touch coordinates on the display screen. According to some embodiment, a single touch that is detected on the area provided with multi-touch capability is not reported by the single-touch interface but rather by the multi-touch interface. This configuration is used in order to avoid double-reporting of interaction coordinates to the host computer.

According to some embodiments of the present invention, digital unit 20 is operative to control operation of one or more ASIC(s) 16. According to some embodiments of the present invention, digital unit 20 is operative to provide a command signal to ASIC 16 to switch between a plurality of available circuit paths (two or more) to connect to outputs of the various conductive lines in the grid. In some exemplary embodiments, digital unit 20 together with ASIC 16 provides for alternately connecting outputs of the various conductors to one of an array of differential amplifiers and an array of single ended amplifiers (or differential amplifiers with one grounded input). According to some embodiments of the present is invention, digital unit 20 is operative to control triggering of one or more conductive lines. According to some embodiments of the present invention, ASIC 16 together with digital unit 20 provides for triggering various conductors with an oscillating signal having a selected pre-defined frequency.

According to some embodiments, digital unit 20 produces and manages a triggering pulse to be provided to an excitation coil 26 that surrounds the sensor arrangement and the display screen. The excitation coil provides a trigger pulse (in the form of an electric or electromagnetic field) that excites passive or active circuitry in the stylus to produce a response from the stylus that can subsequently be detected.

According to some embodiments, digital unit 20 produces and sends a triggering pulse to at least one of the conductive lines.

According to some embodiments of the invention, digital unit 20 includes at least a memory unit and a processing unit to store and process information obtained from ASIC 16. Memory and processing capability is also generally included in host 22 and ASIC 16. According to some embodiments of the present invention memory and processing functionality may be divided between any two or three of host 22, digital unit 20, and ASIC 16 or may reside in only digital unit 20 and host 22.

Stylus Detection

Optionally, stylus detection is provided in both single and multi-touch detection areas. According to some embodiments of the present invention, the stylus is a passive element. Optionally, the stylus comprises a resonant circuit, which is triggered by excitation coil 26 to oscillate at its resonant frequency. At the resonant frequency, the circuit produces oscillations that continue after the end of the excitation pulse and steadily decay. While the stylus touches and/or hovers over digitizer 20, the decaying oscillations induce a voltage in nearby conductive lines which are sensed by sensor 12. Alternatively, the stylus may include an energy pick-up unit and an oscillator circuit. Alternatively, the stylus is an active element and includes a battery as the energy source and the excitation coil is not required. The output frequency of the stylus can be different from the exciting frequency.

Figure 2:
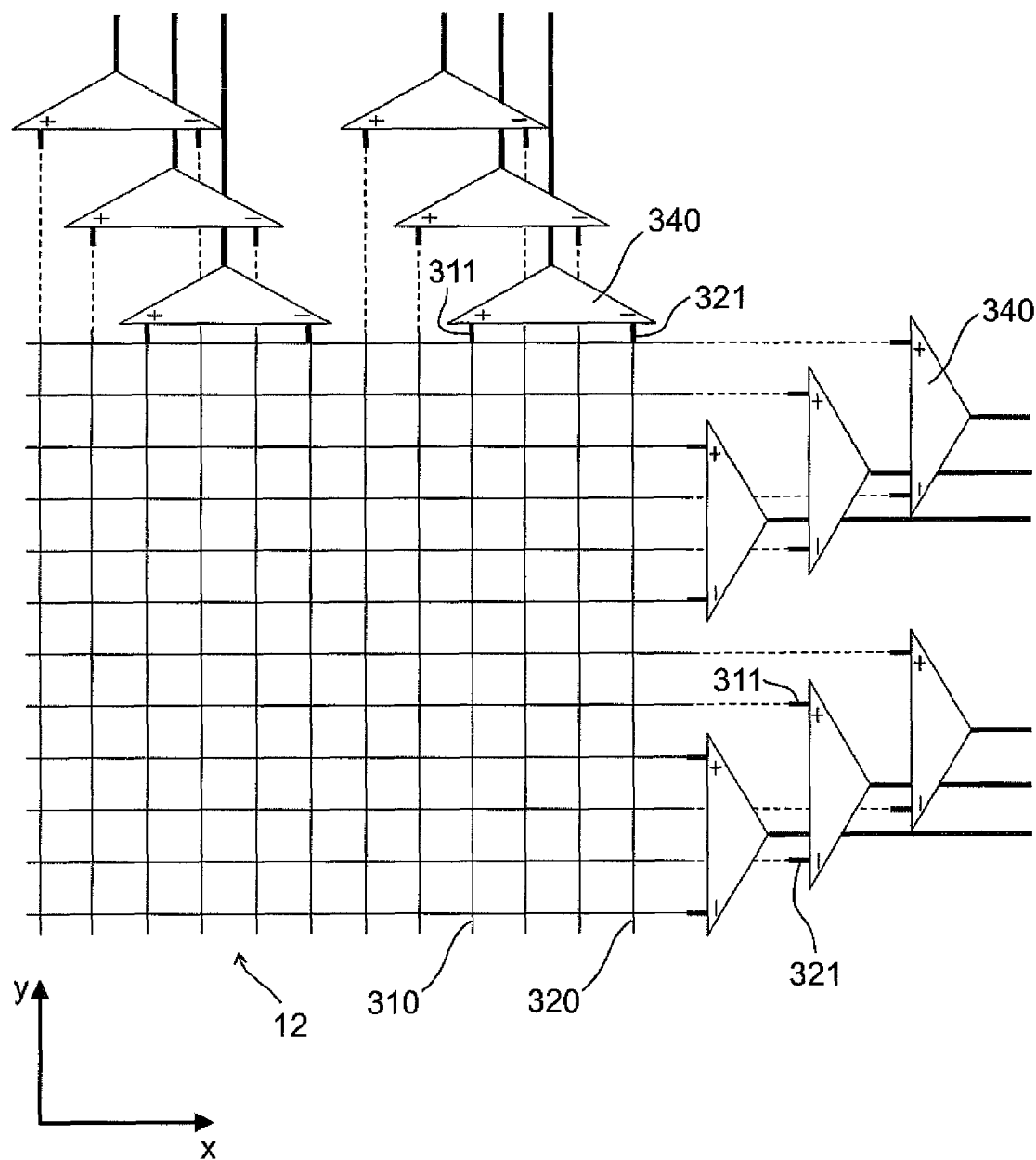
FIG. 2 is an exemplary simplified circuit diagram of a digitizer sensor including differential amplifiers for use with some embodiments of the present invention.

Reference is now made to FIG. 2 showing an array of conductive lines of the digitizer sensor as input to differential amplifiers according to some embodiments of the present invention. According to some embodiments of the present invention, two parallel sensor lines, e.g. lines 310 and 320 that are close but not adjacent to one another are connected respectively to the positive input 311 and negative input 321 of a differential amplifier 340. Amplifier 340 is thus able to generate an output signal which is an amplification of the difference between the two sensor line signals. An amplifier having a stylus on one of its two sensor lines will produce a relatively high amplitude output. Typically output is detected on sensor lines in both the X and Y direction to locate the coordinates of a stylus interacting with sensor 12. In some exemplary embodiments, a single input amplifier is implemented and difference signal is determined by software embedded in digital unit 20. It is noted that although determining the difference signal by software may provide more versatility it may also limit the dynamic range of the signal that can be sampled. Stylus detection is described with further details, for example in incorporated U.S. Pat. No. 7,292,229.

Finger Touch Detection—Single Touch Detection Method

Figure 3:
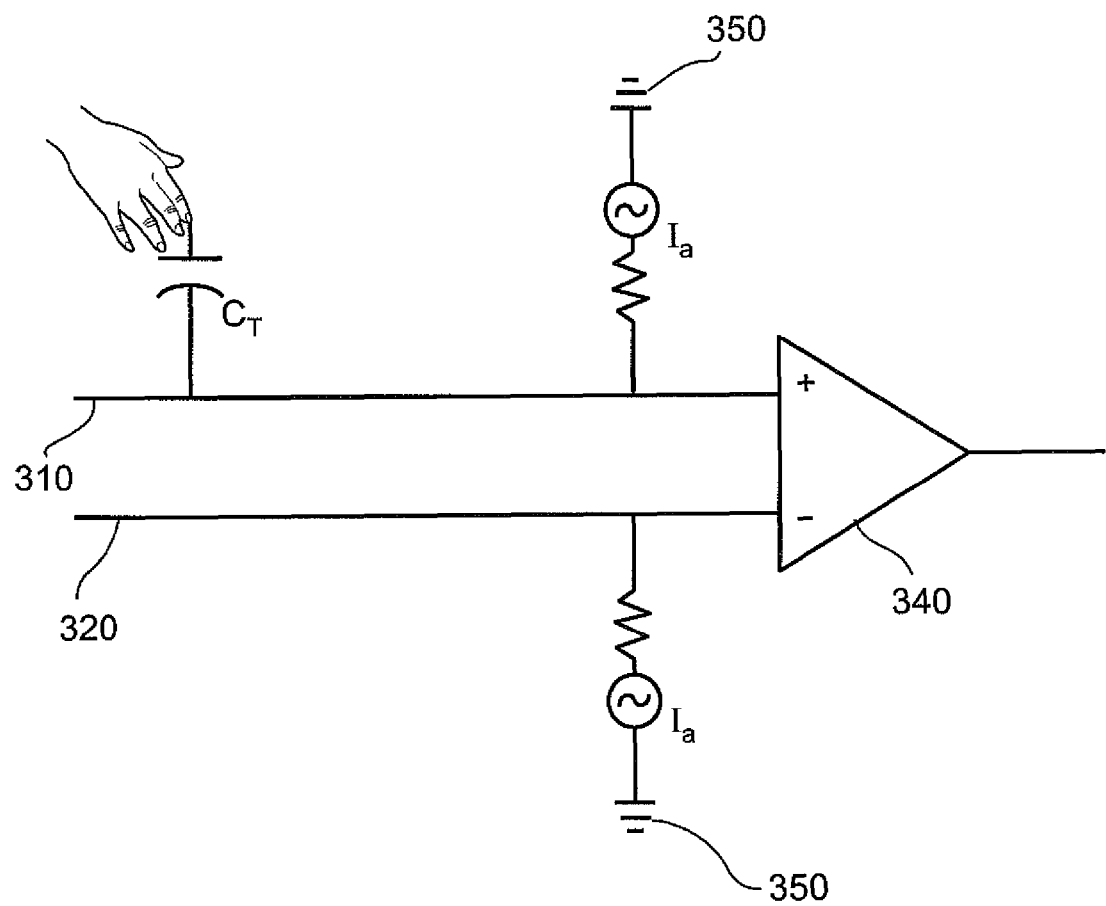
FIG. 3 is an exemplary simplified circuit diagram for touch detection based on a single touch detection method for use with some embodiments of the present invention.

Reference is now made to FIG. 3 showing an exemplary simplified circuit diagram for touch detection based on a single touch detection method for use with some embodiments of the present invention. Conductive lines 310 and 320 are parallel non-adjacent lines of sensor 12. According to some embodiments of the present invention, conductive lines 310 and 320 are interrogated to determine if there is a finger input signal derived from finger touch and/or finger hovering. To query the pair of conductive lines, a signal source $I_a$, e.g. an AC signal source induces an oscillating signal in the pair. Signals are referenced to a common ground 350. When a finger is placed on one of the conductive lines of the pair, a capacitance, $C_T$, develops between the finger (either touching or hovering over the digitizer) and conductive line 310. As there is a potential between the conductive line 310 and the user's finger, current passes from the conductive line 310 through the finger to ground. Consequently a potential difference is created between conductive line 310 and its pair 320, both of which serve as input to differential amplifier 340.

Separation between the two conductive lines 310 and 320 is typically greater than the width of the finger so that the necessary potential difference can be formed, e.g. approximately 12 mm. Typically a finger touch on the sensor may span 2-8 lines, e.g. 6 conductive lines. Typically, the finger hovers over and/or touches the digitizer over a number of conductive lines so as to generate an output signal in more than one differential amplifier, e.g. a plurality of differential amplifier's. However, a finger touch may be detected when placed over one conductive line. Typically a finger hovering at a height of about 1 cm-2 cm above the digitizer can be detected. The differential amplifier 340 amplifies the potential difference developed between conductive lines 310 and 320. ASIC 16 and digital unit 20 process the amplified signal and determine the location and/or position of the user's finger based on the amplitude and/or signal level of the sensed signal. Although only one pair of conductive lines are shown, it is noted that typically touch is typically detected based on a plurality of outputs from differential amplifiers with input obtained from interleaving conductive lines.

In one example, the origin of the user's finger from the two inputs of the differential amplifier is determined by examining the phase of the output. In another example, since a finger touch typically produces output in more than one conductive line, the origin of the user's finger from the two inputs of the differential amplifier is determined by examining outputs of neighboring amplifiers and optionally interpolating is used to find a more accurate value. In yet other examples, a combination of both methods may be implemented. Ambiguity as to the location of each finger may arise in some finger positions when a user concurrently places two fingers on or over sensor 12. As such a plurality of concurrent interactions cannot always be detected without ambiguity using the single touch detection method. According to some embodiments of the present invention, stylus interaction can be detected concurrently with finger touch using this detection method. Typically, the stylus is triggered at a frequency other than the frequency used for finger detection so that finger and stylus detection can be differentiated.

According to some embodiments of the present invention, this method of touch detection which is described with farther details in, for example incorporated U.S. Pat. No. 7,372,455 is implemented for single touch detection. The present invention is not limited to the technical description of the digitizer system described herein. The present invention may also be applicable to other digitized sensor and touch screens known in the art, depending on their construction. The present invention may also be applicable to other touch detection methods known in the art.

Finger Touch Detection—Multi-Touch Detection Method

Reference is now made to FIGS. 4A, 4B, 4C and 4D showing four different exemplary simplified circuit diagrams for touch detection based on a multi-touch detection method for use with some embodiments of the present invention. According to some embodiments of the present invention, multi-touch detection is a capacitive-based detection method. At each junction, e.g. junction 40 in sensor 12 a certain minimal amount of capacitance exists between orthogonal conductive lines. When a finger 46 touches (or hovers over) the sensor, the capacitance formed in junctions 42 within the vicinity of finger 46 typically increases since the finger typically drains current from the lines to ground.

According to some embodiments of the present invention, the change in capacitance at one or more junctions 42 is detected by triggering one or more parallel conductive lines, e.g. active line(s) 302 of sensor 12 with an AC signal 60 and detecting signals 65 crossing by virtue of the capacitance to crossing lines, e.g. passive lines 301 orthogonal to triggered line 302. Typically, the presence of a finger decreases the amplitude of the coupled signal by 5-15% or 15-30% and thereby can be detected. It is noted that although in FIGS. 4A-4D one axis is shown as the active axis and the other axis is shown as the passive axis, either one of the axes can serve as the active or passive axis. Furthermore, it is noted that the active and passive axes can be dynamically switched by ASIC 16 together with digital unit 20.

According to some embodiments of the present invention, the procedure for detection includes triggering each conductive line along one axis of the sensor, e.g. each active line 302, one line at a time, and after each triggering, sampling signals, e.g. simultaneously in all lines crossing that triggered line, e.g. all lines of the orthogonal axis (passive lines 301). This triggering and detecting procedure is repeated until all the lines in the active axis have been triggered and interaction in all junction points has been detected. This multi-touch detection method provides for constructing two dimensional images that indicate positions a plurality of fingers (and conductive objects) concurrently interacting with sensor 12. Typically, such an image indicates on which junction an interaction, e.g. a touch is present. Optionally, multi-touch detection is provided in specified pre-defined areas of sensor 12 and only the active line and passive lines crossing the pre-defined areas are triggered and sampled. In some exemplary embodiments, multi-touch detection provides for simultaneously trigger more than one line with different frequencies as is described in more detail in incorporated US Patent Application Publication No. 20070062852. The present invention is not limited to the technical description of the digitizer system described herein. The present invention may also be applicable to other digitized sensor and touch screens known in the art, depending on their construction. The present invention may also be applicable to other touch detection methods known in the art.

It is appreciated that although the conductive lines 302 parallel to the Y axis are shown as the active lines and the conductive lines 301 parallel to the X axis are shown as the passive line, the opposite arrangement may also be used. According to some embodiments of the present invention, conductive lines 301 and 302 may be dynamically selected to be either the passive or active lines. According to some embodiments of the present invention, outputs of the defined passive lines are connected to inputs of amplifiers. According to some embodiments of the present invention, the active lines, e.g. the lines that are triggered are chosen to correspond to the lines crossing the shortest dimension of the detection area so that the number of times all the cross lines need to be sampled, e.g. corresponding to each time a line is triggered is reduced. Multi-touch detection is described with further details, for example in incorporated U.S. Pat. No. 7,372,455 and US Patent Application Publication No. 20070062852. The present invention is not limited to the multi-touch detection system and method described herein. The present invention may also be applicable to other multi-touch detection methods and sensors depending on their construction.

Figure 4A:
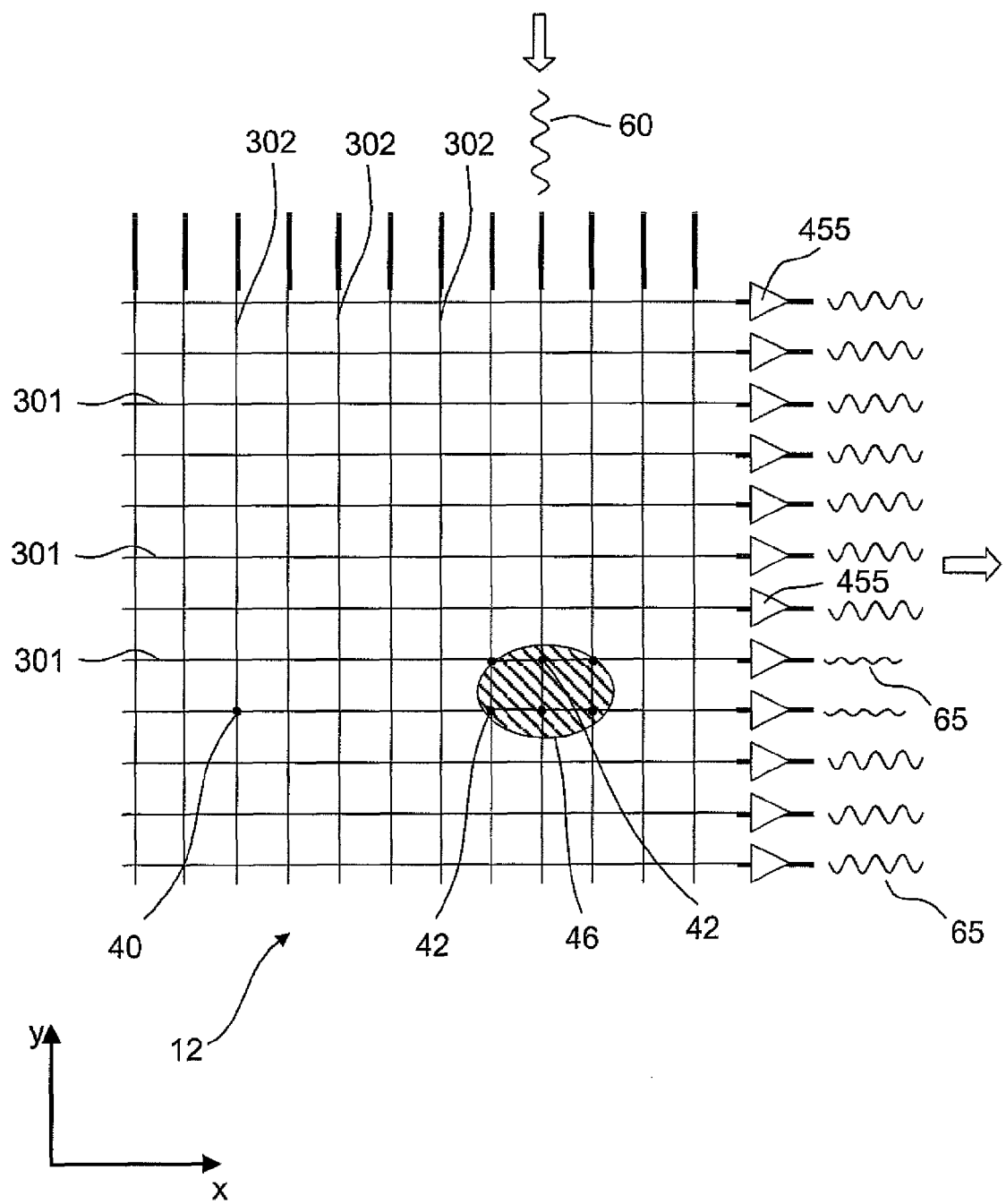
FIGS. 4A-4D are four different exemplary simplified circuit diagrams for touch detection based on a multi-touch detection method for use with some embodiments of the present invention.
Figure 4B:
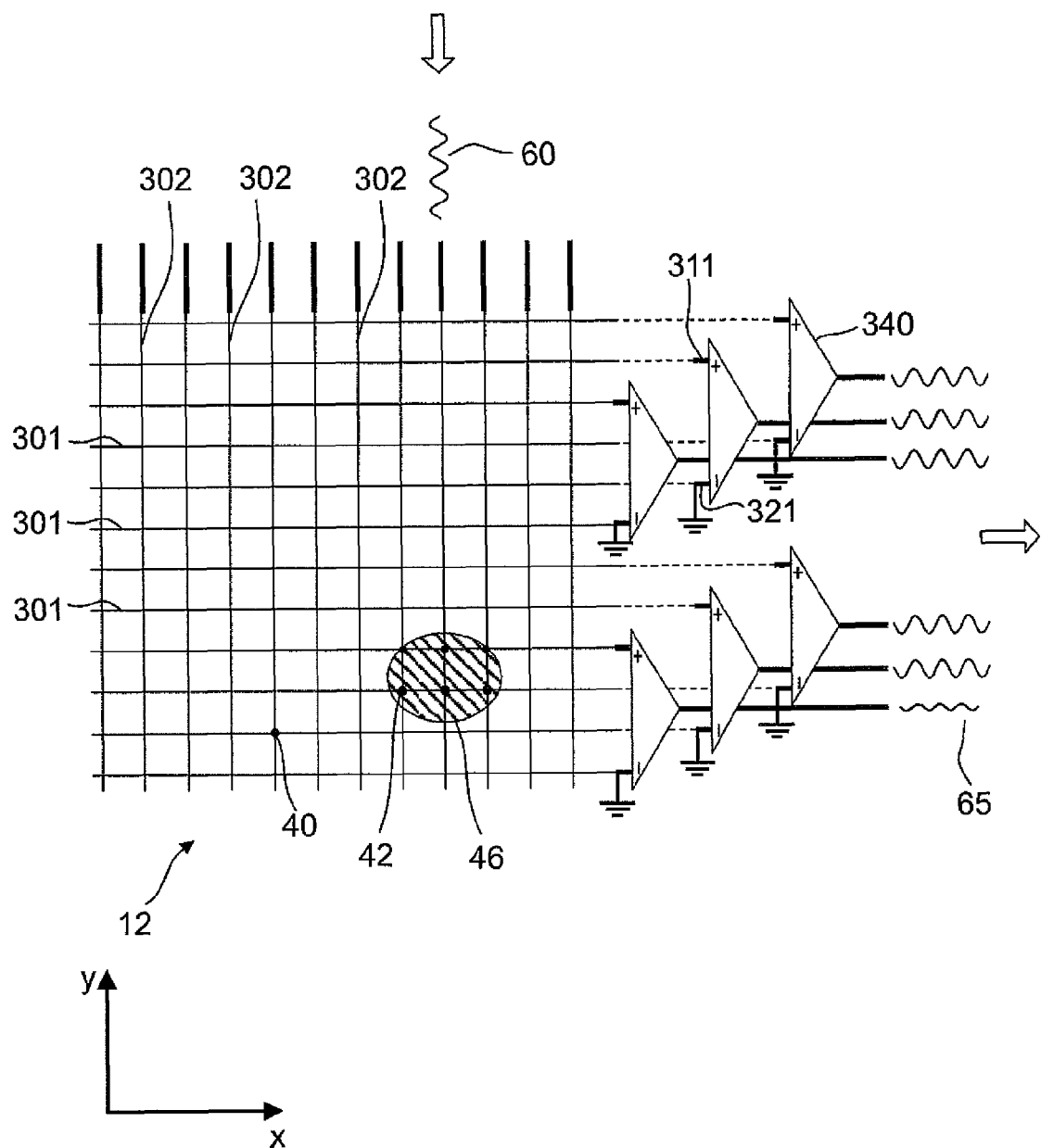
Figure 4C:
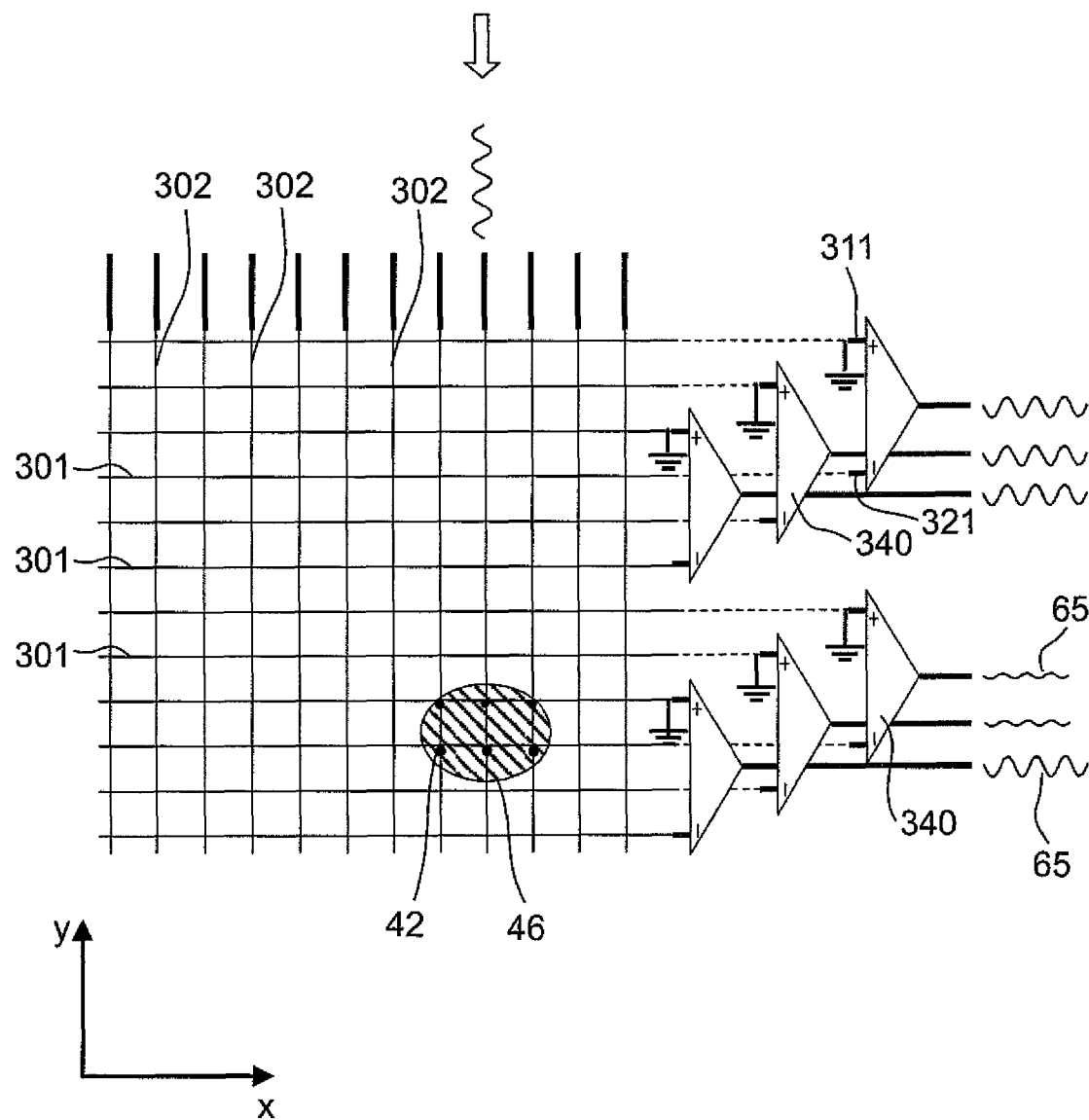
Figure 4D:
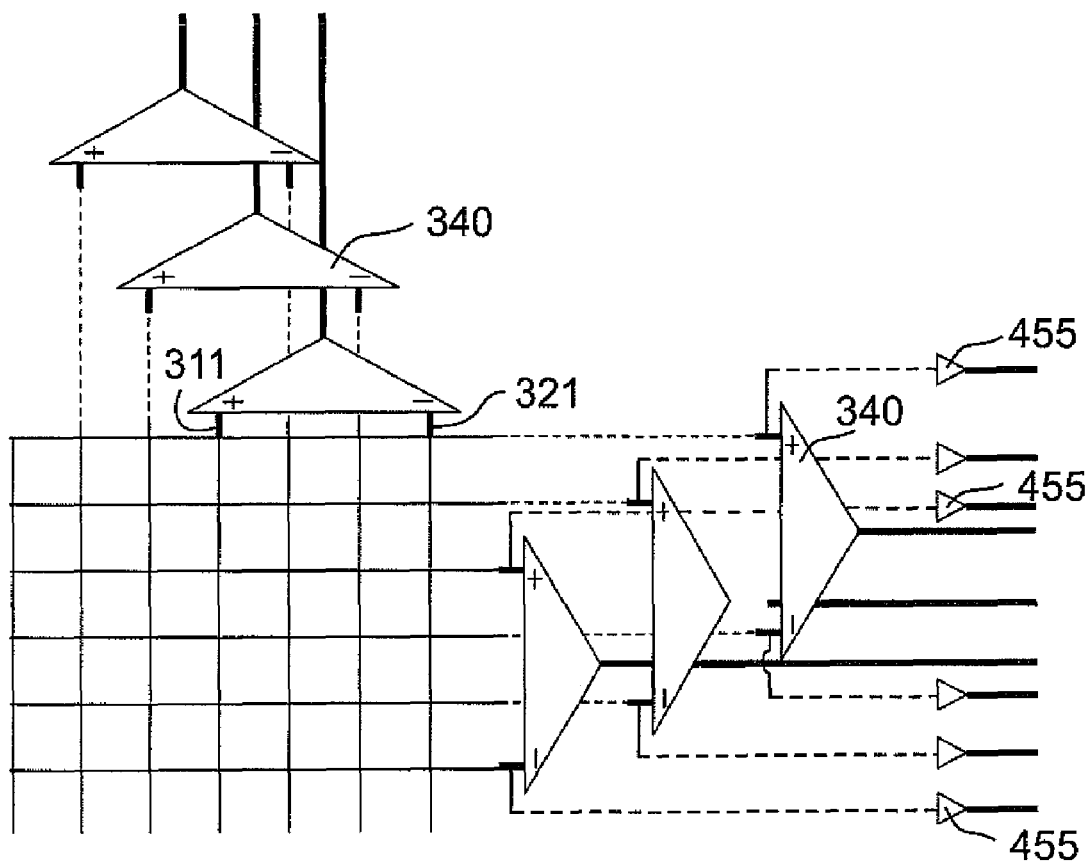

According to some embodiments of the present invention, each conductive line of the passive axis is input to an amplifier. In some exemplary embodiments, the amplifier is a single ended amplifier 445 (FIG. 4A). In some exemplary embodiments, the amplifier is a differential amplifier 340 where one input to differential amplifier 340 is ground (FIG. 4B-4C). In some exemplary embodiments, output from passive lines 301 are connected to a differential amplifier 340 as well as to a single ended amplifier 455 and output can be sampled from either one of the amplifiers and/or from both (FIG. 4D).

According to some embodiments of the present invention, when one of the inputs to the differential amplifier is ground, each triggering event of an active line 302 provides for sampling only half of the passive lines 301. According to some embodiments of the present invention, connection to ground is toggled between each of the inputs (positive and negative) of differential amplifier 340 so that all lines of the sensor lines can be detected. In some exemplary embodiments an active line 302 is triggered once to detect all positive inputs to the differential amplifiers 340 (FIG. 4B) connection to ground is then toggled and the same active lines is triggered again so that all negative inputs to the differential amplifiers 340 are detected (FIG. 4C). In some exemplary embodiments, during a first triggering event positive inputs to a first portion of the differential amplifiers are grounded while the negative input of a second portion of the amplifiers are grounded. During a subsequent triggering event of the same active line, grounding of each of the amplifiers is toggled.

According to some embodiments of the present invention, during each sweep only half the conductive lines are sampled and the resolution in the sampling axis is thereby reduced. In some exemplary embodiments, a first half of the lines, e.g. every other line, are sampled over one refresh cycle are a second half of the lines are sampled in a subsequent refresh cycle. However, it is noted that although the resolution in this case is compromised, processing time and power is reduced. In some exemplary embodiments, a single input amplifier is implemented and the different difference signals are determined by software embedded in digital unit 20.

According to some embodiments of the present invention, stylus detection is provided concurrently with finger touch (or conductive object) detection. Typically, a frequency output of the stylus signal is other than the frequency used for finger detection so that finger and stylus detection can be differentiated. According to some embodiments of the present invention, output from both the passive and active lines is detected, e.g. via amplifiers so that stylus interaction can be detected concurrently with finger interaction.

As can be appreciated by the persons skilled in the art, the single touch detection methods described in reference to FIGS. 2-3 is inherently faster and more economical in terms of processing as compared to the multi-touch detection methods described in reference to FIGS. 4A-4C that requires sequential scanning of the conductive lines, e.g. the passive lines.

In FIG. 4D an exemplary simplified circuit diagram for touch detection based on multi-touch detection as well as single touch detection is shown. According to some embodiments of the present invention, based on this configuration the sensor can be sampled to detect stylus interaction from output of the differential amplifiers substantially simultaneously with sampling output from single ended amplifiers for detecting interaction based on a multi-touch detecting method is shown. According to some embodiments of the present invention, sensor lines along at least one axis are input to both a differential amplifier and a single ended amplifier and output from the sensor lines can be sampled from output of single ended amplifiers 455 and/or differential amplifiers 340 based on the detection method used. For example, sensor lines are connected to a differential amplifier as shown in FIG. 2 and also to a single ended amplifiers as shown in FIG. 4A. According to some embodiments of the present invention, based on this configuration the sensor can be sampled to detect stylus interaction from output of the differential amplifiers substantially simultaneously with sampling output from single ended amplifiers for detecting interaction based on a multi-touch detecting method. It is noted that although the invention has been described mostly in reference to defining different areas for single touch detection and multi-touch detection, the invention can also be applied to defining areas for two other detection methods. In some exemplary embodiments, different areas are defined for multi-touch detection and stylus detection using methods described herein.

The present invention is not limited to the technical description of the digitizer system described herein. Digitizer systems used to detect stylus and/or finger touch location may be, for example, similar to digitizer systems described in incorporated U.S. Pat. Nos. 6,690,156, 7,292,229, 7,372,45, and/or US Patent Application Publication No. 20070062852. It will also be applicable to other digitized sensor and touch screens known in the art, depending on their construction.

Figure 5:
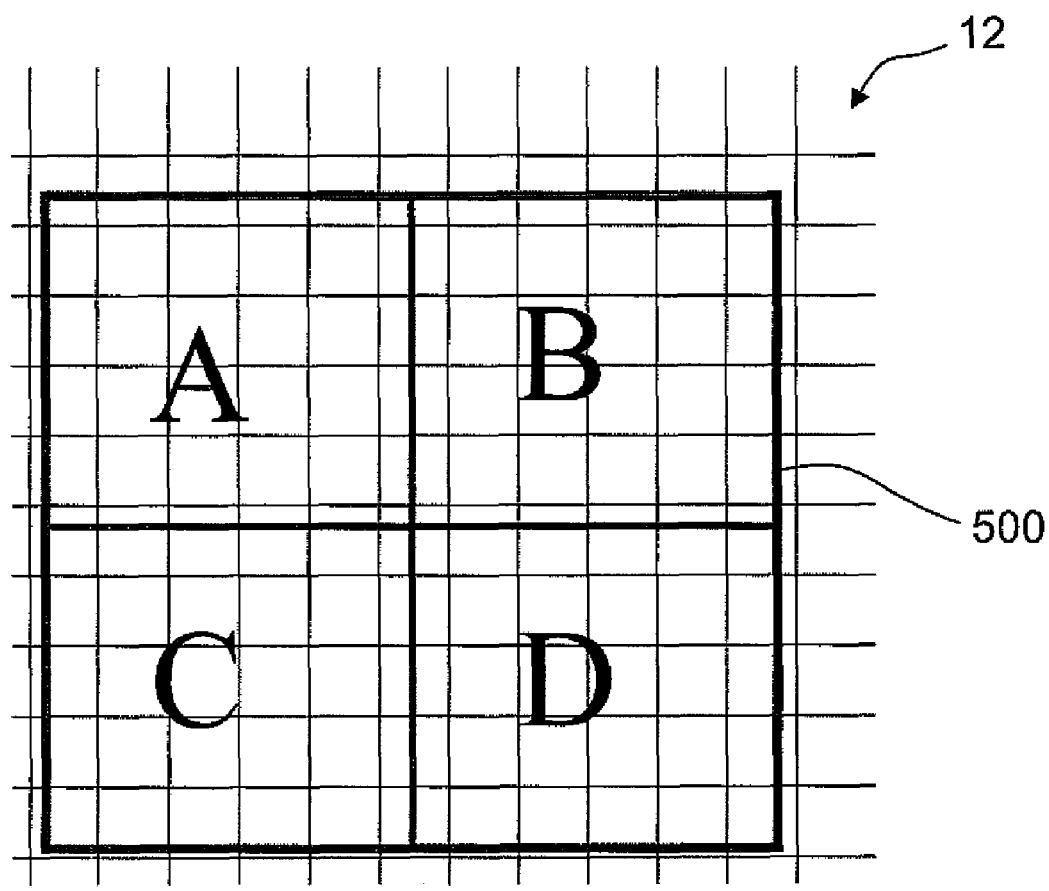
FIG. 5 is an exemplary schematic diagram of a touch sensitive screen where different detection methods are applied over different areas of the touch sensitive screen in accordance with some embodiments of the present invention.

Reference is now made to FIG. 5 showing an exemplary schematic diagram of a touch sensitive screen where different detection methods are applied over different areas of the touch sensitive screen in accordance with some embodiments of the present invention. According to some embodiments of the present invention, a detection area 500 is divided into a plurality of settable detection areas, e.g. detection areas A, B, C and D. According to some embodiments of the present invention, a grid based sensor 12 is spread over detection area 500 and used to sense user interaction such as finger object and stylus that touches or hovers over sensor 12. According to some embodiments of the present invention, touch is detected from each of the areas using the same sensor 12 but different detection methods. Typically, the different detection methods require different circuitry connected to outputs of the sensor lines, e.g. circuitry shown in FIG. 2, 4A-4C. In some exemplary embodiments, the circuit path for different detection methods is the same and the different processing of the output signals is achieved by software. According to some embodiments of the present invention, some areas such as areas A and D or areas B and C do not have any sensor lines in common, e.g. are mutually exclusive so that the different detection methods do not interfere with one another. According to some embodiments of the present invention interaction in mutually exclusive areas can be detected simultaneously using different detection methods. For example, to detect touch in area B, circuitry associated with detection method B is connected to the sensor lines included in area B. At substantially the same time, circuitry associated with detection method C is provided on output of the sensor lines included in area C without interfering with the detection in area B. As such touch detection can be performed in area B and C at substantially the same time period. Similarly, touch detection can be performed in area A and area D at substantially the same time period without causing interference. According to some embodiments of the present invention, areas A, B, C, D are set per application or changed as the application unfolds.

According to some embodiments of the present invention, different detection areas using different detection methods include common lines within their defined areas. For example areas A and B include common lines, e.g. share lines, in the horizontal direction. Applying circuitry associated with detection method A may interfere with detection of touch in detection area B. According to some embodiments of the present invention, interactions in the different detection areas are detected in a sequential manner.

Figure 6:
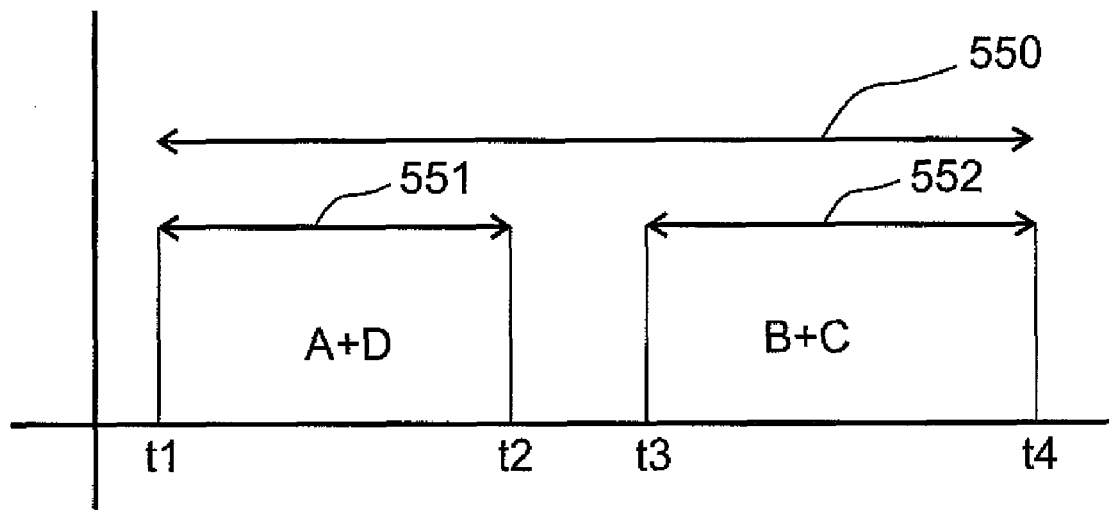
FIG. 6 is a simplified exemplary time line for sensing different areas of a touch sensitive screen based with different detection methods over once detection cycle in accordance with some embodiments of the present invention.

Reference is now made to FIG. 6 showing a simplified exemplary time line for sensing different areas of a touch sensitive screen with different detection methods over one detection cycle in accordance with some embodiments of the present invention. According to some embodiments of the present invention, over each sampling cycle and/or period 550 interactions in each of the different detection areas A, B, C, and D is detected. According to some embodiments of the present invention, during a first sub-period 551 between times $t_1$ and $t_2$, a circuit path corresponding to one or more mutually exclusively areas, e.g. area A and D is applied to output of sensor 12 and detection in those areas is performed using detection methods defined for those areas. During a following second sub-period 552 between time $t_3$ to $t_4$, (during the same sampling period), circuitry corresponding to one or more other mutually exclusively areas, e.g. area B and C is applied for sampling sensor 12 and detection in those areas is performed using detection methods defined for those areas. In some exemplary embodiments a cycle includes more than two sub-sampling periods. In some exemplary embodiments, none of the defined areas are mutually exclusive areas and each area is detected over a separate sub-sampling period.

Figure 7:
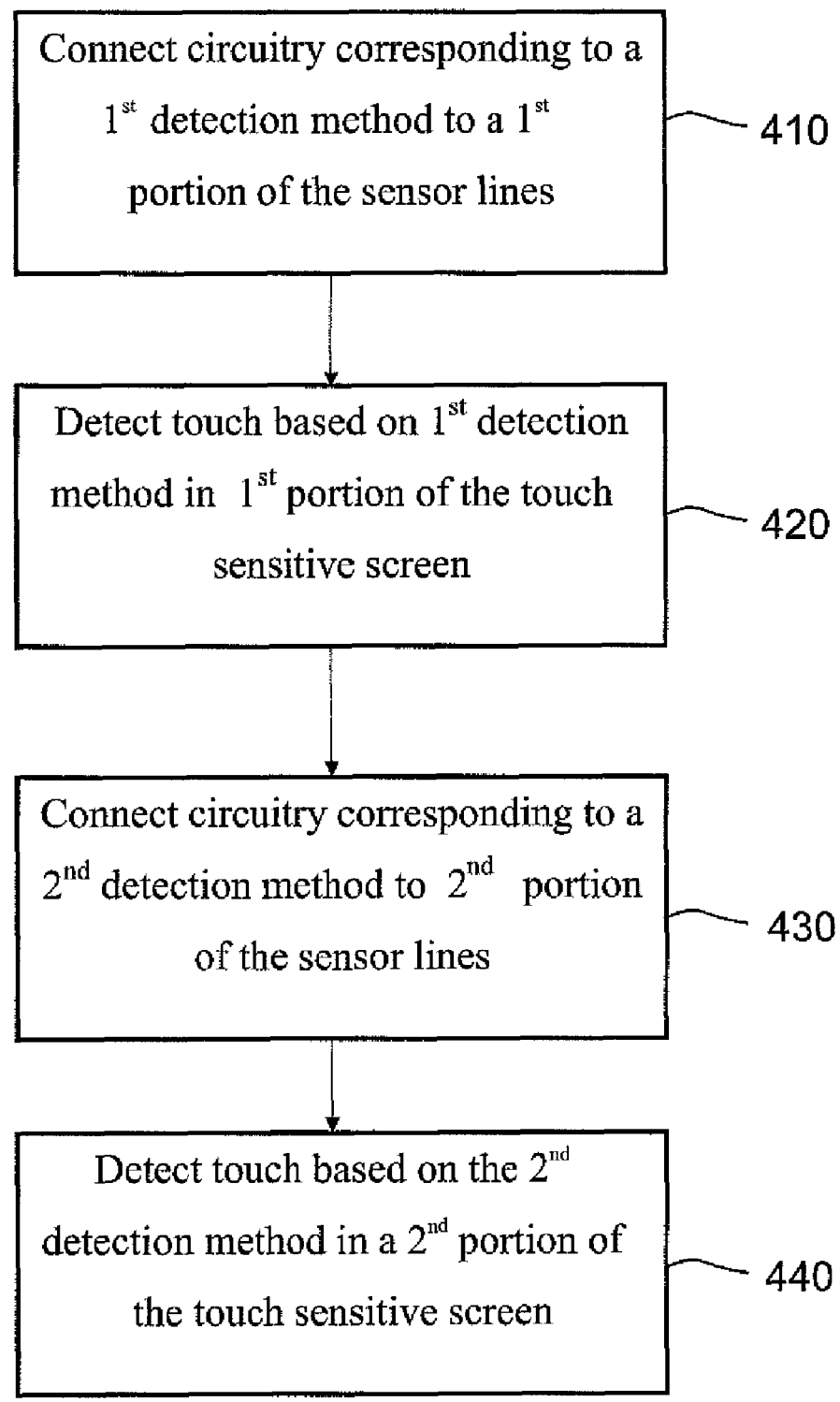
FIG. 7 is an exemplary flow chart describing a method for applying different detection methods to different pre-defined areas on a touch sensitive sensor in accordance with some embodiments of the present invention.

Reference is now made to FIG. 7 showing an exemplary flow chart describing a method for applying different detection methods to different pre-defined areas on a touch sensitive sensor in accordance with some embodiments of the present invention. According to some embodiments of the present invention, circuitry corresponding to a first detection method is applied to output of a plurality of sensor lines included within a first portion, e.g. detection area of a touch sensitive screen (block 410). According to some embodiments of the present invention, touch (or hover) interaction is detected using the first detection method over the first portion of the touch sensitive screen (block 420). According to some embodiments of the present invention, circuitry corresponding to a second detection method is applied to outputs of a plurality of sensor lines included within a second portion, e.g. detection area of a touch sensitive screen (block 430).

According to some embodiments of the present invention touch (or hover) interaction is detected using the second detection method over the second portion of the touch sensitive screen (block 440). In some exemplary embodiments, blocks 430 and 440 are repeated for other portions of the touch sensitive screen to be detected with other detection methods until detection in all portions of the touch sensitive screen has been completed. According to some embodiments of the present invention, each portion of the screen is sampled once during each sampling period. In some exemplary embodiments, some portions of the screen are sampled at a higher rate than other portions. In some exemplary embodiments, some portions of the screen, e.g. one or more pre-defined detection areas, are sampled at a lower resolution than other pre-defined areas, e.g. only a portion of the sensor lines in the detection area is sampled.

Figure 8A:
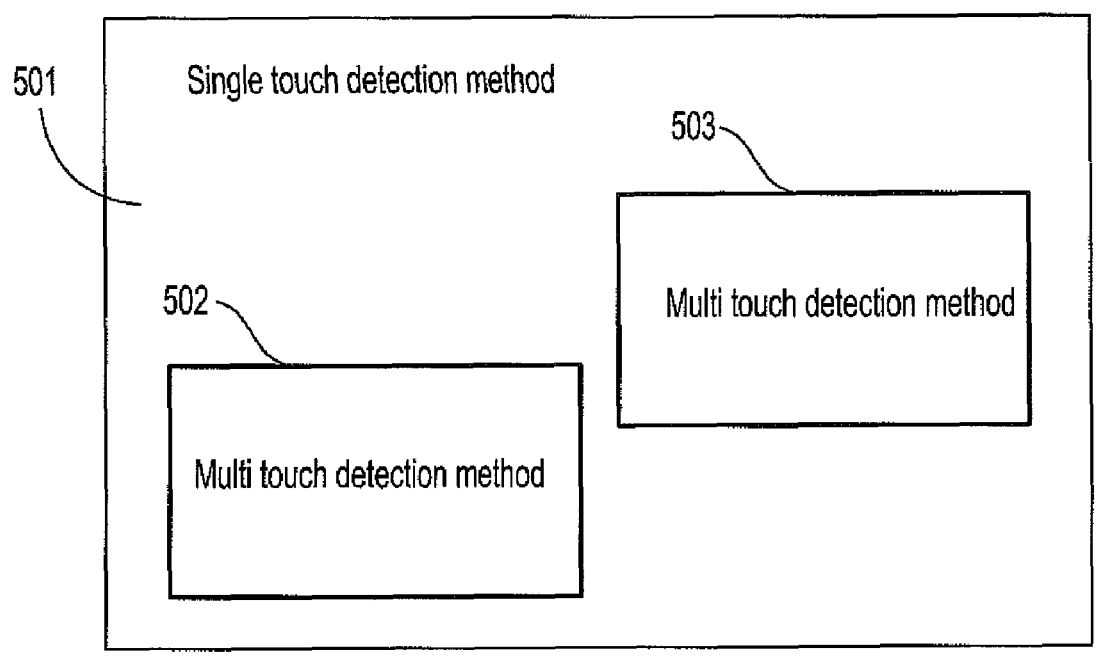
FIGS. 8A and 8B are schematically illustrations of a touch screen including one or more areas designated for multi-touch detection in accordance with some embodiments of the present invention.
Figure 8B:
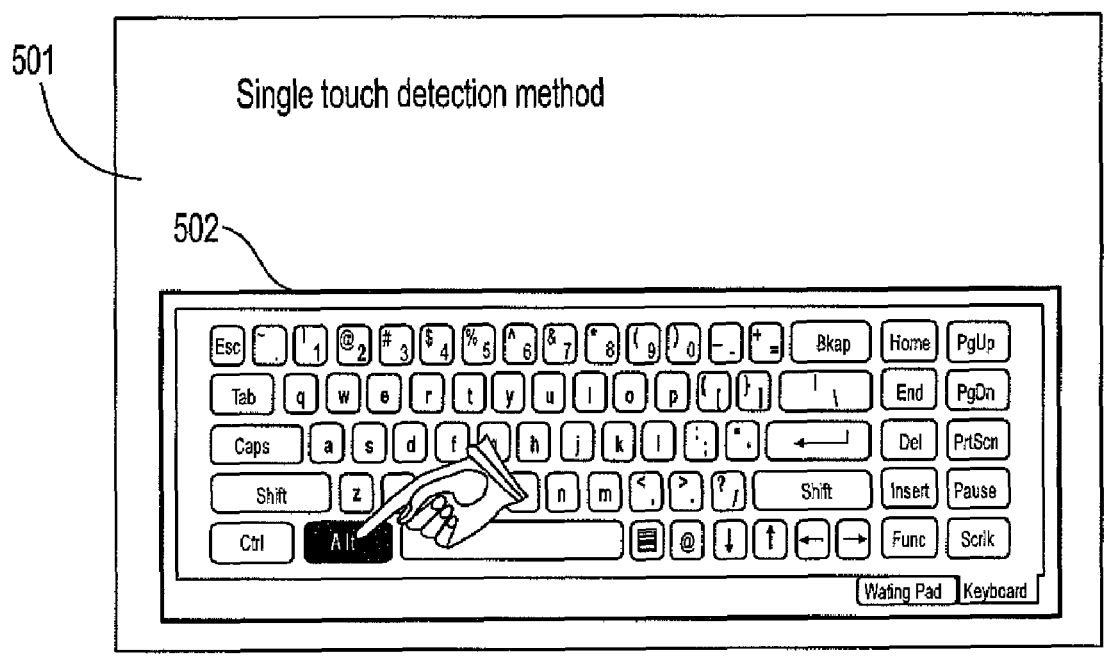

Reference is now made to FIGS. 8A and 8B schematically illustrating a touch screen including one or more areas designated for multi-touch detection in accordance with some embodiments of the present invention. According to some embodiments of the present invention detection area 501 of a touch sensitive screen is generally implemented with single touch detection but also provides one or more pre-defined areas, e.g. areas 502 and 503 where multi-touch detection is provided. In some exemplary embodiments, the single touch detection method is implemented over the entire touch sensitive screen while the multi-touch detection is only implemented in areas designated for multi-touch application. The present inventors have found that by providing both detection methods, refresh rate can be increased, and processing time and power can be saved in areas of the graphical user interface where single touch detection is expected and/or is required while providing multi-touch functionality in specific areas where multi-touch interaction, e.g. input is allowed and/or is possible. As indicated above, the single touch detection method is faster and requires less power consumption as compared to multi-touch detection method. According to some embodiments of the present invention, implementing multi-touch detection only in specific areas of the touch sensitive screen, e.g. where multi-touch functionality is required, provides for reducing, e.g. optimizing, the overall processing required.

According to some embodiments of the present invention, stylus interaction is provided in both the multi-touch detection area and the single touch detection area. In some exemplary embodiments, single touch detection is implemented in both the single touch detection area 501 and the multi-touch detection area(s) 502 and 503. Typically, to avoid ambiguity, the graphical user interface is designed so that a user does not interact, e.g. provide input in a single touch detection area concurrently with interaction in a multi-touch detection area. Optionally, a user is requested not to touch the single touch designated area while touching the multi-touch designated area/s. According to some embodiments of the present invention, stylus interaction is detected, e.g. sensor is sampled to detect stylus during single touch detection.

According to some embodiments of the present invention, multi-touch area(s) 502 and/or 503 is continuously adjusted in accordance with the area of the running multi-touch application, e.g. the area of the graphical window providing (including) multi-touch functionality. According to some embodiments of the present invention the multi touch area is adjusted by dynamically changing its position change and/or dimension. According to some embodiments of the present invention, the axis from which individual lines are triggered is also dynamically adjusted based on the dimensions of the multi-touch detection area. For example, the shorter side of the rectangular area is used as the side from which the lines are triggered to reduce, e.g. minimize the number of times that the cross lines need to be sampled. According to some embodiments of the present invention, the multi-touch areas are not changed during operation of a particular application.

Optionally, the scanning and/or refresh rate is dynamically adjusted in accordance with the size of the area provided with multi-touch detection method, e.g. for larger area size, a lower scanning rate is used. Optionally, the area provided with multi-touch detection method has a fixed size. Optionally, the area provided with multi-touch detection method has a fixed scanning rate. Optionally, single touch detection is always provided on the entire screen, where the multi-touch area is additionally provided with multi-touch detection method. Optionally, single-touch method is not provided on the multi-touch area.

In some exemplary embodiments, the multi-touch application is a virtual keyboard application (FIG. 5B). According to some embodiments of the present invention, the display screen 501 implements single touch detection in all areas other than the area over which the virtual keyboard is displayed and multi-touch detection is implemented only in the area over defined by the virtual keyboard. According to some embodiments of the present invention, multi-touch detection provides for detection of concurrent selection of one or more control keys of the keyboard with the other keys. In another example, a multi-touch detection area may provide playing chords on a virtual piano.

Figure 9A:
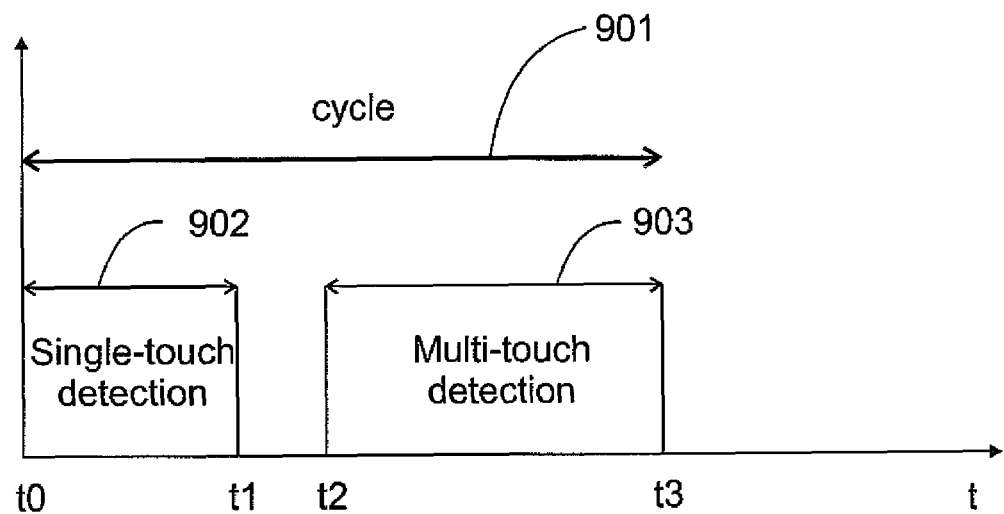
FIGS. 9A and 9B are two simplified exemplary time lines for using single touch detection to detect touch on one part of a touch sensitive screen and using multi-touch detection to detect touch(es) on another part of the touch sensitive screen in accordance with some embodiments of the present invention.

Reference is now made to FIG. 9A showing an exemplary illustration of a cycle for combined multi-touch detection and single-touch detection in accordance with some embodiments of the present invention. According to some embodiment of the present invention, the refresh and/or sampling cycle 901 is divided into time periods for detecting user interaction with each of the detection methods, e.g. such that there is no overlapping between triggering periods of the different detection methods.

In some exemplary embodiments, the cycle begins with the single-touch detection phase 902, i.e. single-touch method triggering period, which lasts from t0 to t1. A triggering pulse is produced by the digital unit 20, as described above, and is provide to at least the conductive lines in the single-touch area. Typically, the triggering pulse is provided to all sensor conductive lines. Output from the amplifiers, e.g. differential amplifiers are sampled, preferably over the entire area detection area.

Following the single-touch phase 902, the cycle continues with the multi-touch detection phase 903, i.e. multi-touch method triggering period, e.g. between times t2 to t3. According to some embodiments of the present invention, multi-touch detection is only implemented within a designated multi-touch detection area, e.g. a triggering signal is provided only to conductive lines within the multi-touch area and only conductive cross lines within the multi-touch detection area are sampled. In some exemplary embodiment, when more than one multi-touch area is required, an additional multi-touch detection phase is provided within the cycle for a second area. In some exemplary embodiments, all multi-touch areas are detected concurrently during a same triggering period.

In exemplary embodiments, when the single-touch area and the multi-touch area have no mutual conductive lines, i.e. no conductive line is partly in the single-touch area and partly in the multi-touch area, single-touch detection phase and multi-touch detection is performed simultaneously. According to some embodiments of the present invention, single touch detection is refreshed at a higher rate than multi-detection, e.g. some cycles include only single touch detection while other cycle include both single touch and multi-touch detection. In some exemplary embodiments, during a single-touch detection period, an excitation signal is provided by digital unit 20 to excitation coil 26 for energizing stylus(es) 44. Typically, the excitation signal is of a second frequency, i.e. stylus frequency.

Figure 9B:
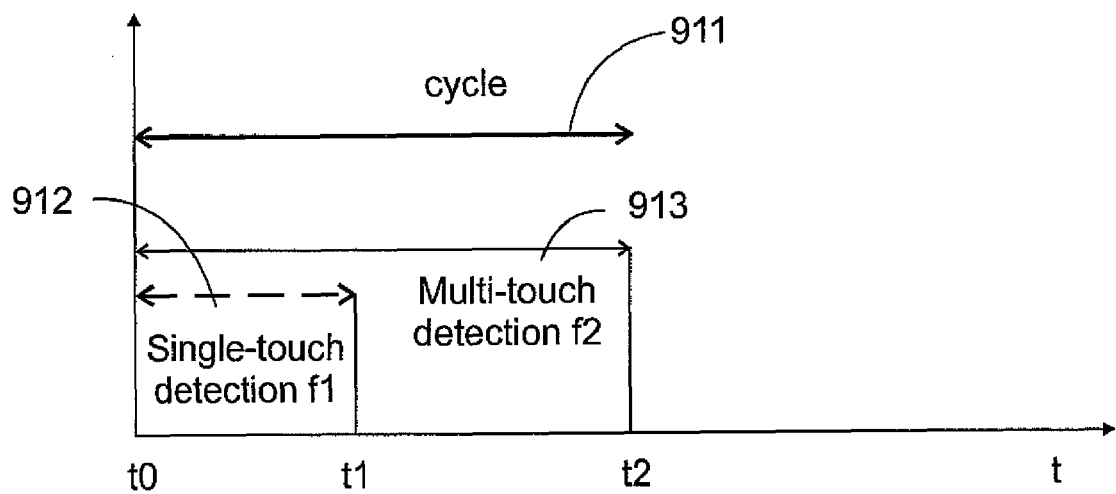

Reference is now made to FIG. 9B showing an exemplary illustration of a cycle for combined multi-touch detection and single-touch detection according to an exemplary embodiment of the present invention. According to some embodiment of the present invention, in order to avoid cross-talk between the different methods signals, a different frequency is used for each touch detection method. Using two frequencies enables overlap between triggering periods of the two detection methods. Typically, multi-touch detection period is longer than the single touch detection period. For example, a cycle 911 may comprise a single-touch detection period 912 that lasts between times t0 to t1 and a multi-touch detection phase 913 that lasts between times t0 to t2. In some exemplary embodiments, for single-touch detection, e.g. during period 912 a triggering pulse of a first frequency is provided to at least the conductive lines included within the single-touch area. Typically, the triggering pulse is provided to all sensor conductive lines.

In some exemplary embodiments, for the multi-touch detection, e.g. during period 913 a triggering signal of a second frequency is provided to conductive lines included within the multi-touch area, e.g. in one axis sequentially. Optionally, a single conductive line is not simultaneously triggered with two triggering signals of different frequencies. In some exemplary embodiments, the multi-touch detection method provides for simultaneously triggering different conductive lines with different frequencies, e.g. more than one frequency is implemented for multi-touch detection. In some exemplary embodiments, the cycle duration is fixed.

In some exemplary embodiments, only a portion of the conductive lines are sampled during each cycle, e.g. every other line or every third line. In some exemplary embodiments, conductive lines within a multi-touch area that were not scanned in a first cycle are scanned in the next cycle(s). In some exemplary embodiments, partial scanning of the lines is implemented for cycles with fixed durations and for large multi-touch detection areas.

In some exemplary embodiments, when more than one multi-touch area is required, an additional multi-touch detection phase using a third frequency is provided within the cycle, wherein the additional phase is provided simultaneously with the two mentioned phases above. In some exemplary embodiments, simultaneously with the single-touch phase, an excitation signal is provided by the digital unit to an excitation coil 26 for energizing an EM stylus. Typically, the excitation signal is of a different frequency, i.e. stylus frequency.

Figure 10:
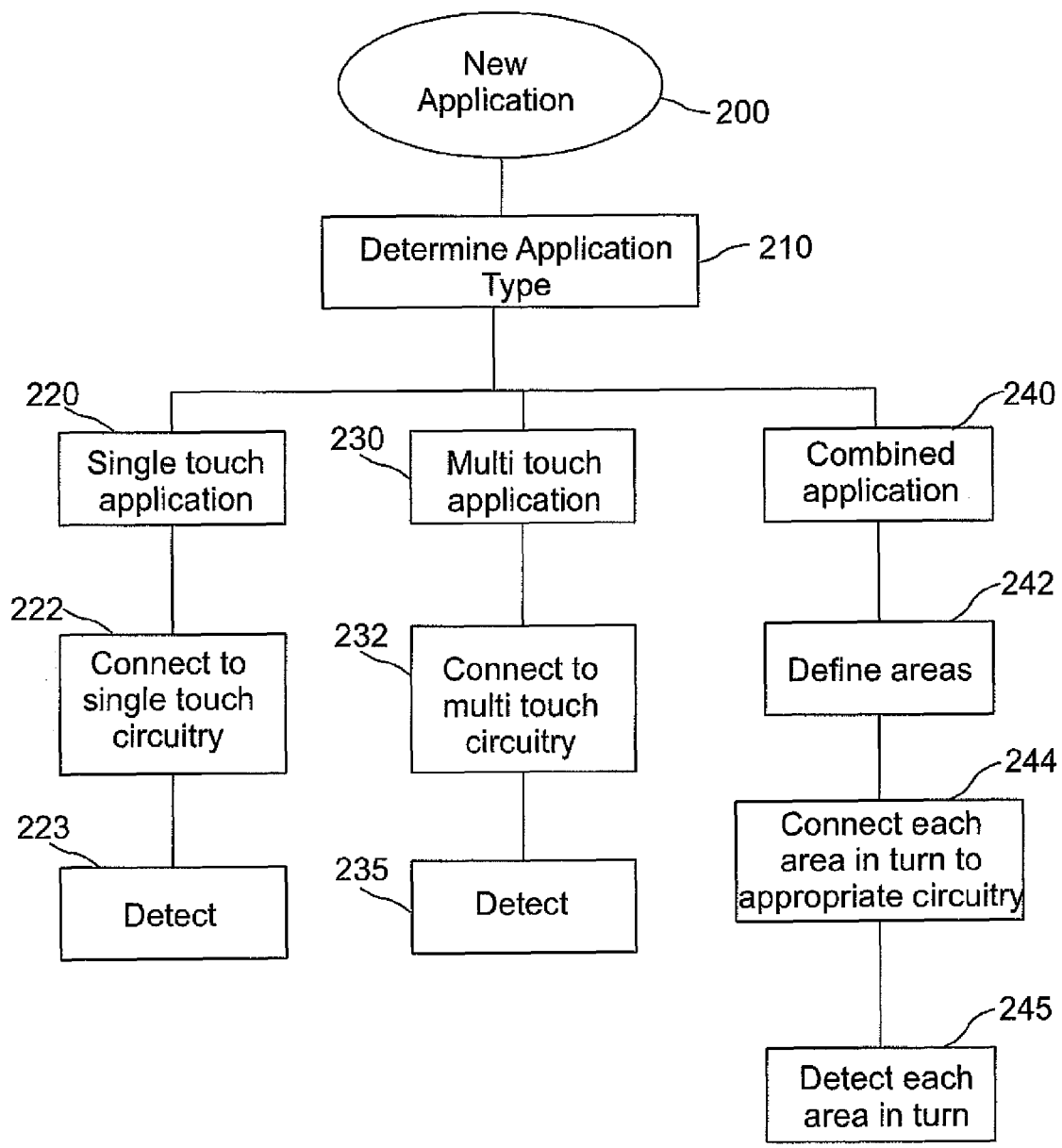
FIG. 10 is an exemplary flow chart of a method for defining detection methods to be implemented by the digitizer system in accordance with some embodiments of the present invention.

Reference is now made to FIG. 10 showing an exemplary flow chart of a method for defining detection methods to be implemented by the digitizer system in accordance with some embodiments of the present invention. According to some embodiments of the present invention, in response to a new software application running on a host associated with a digitizer system (block 200) a signal is transmitted to digital unit 20 indicating the type of detection required by the running application (block 210). Optionally, the signal is transmitted from the host computer. According to some embodiments of the present invention, in response to an indication that the application requires only single-touch detection (block 220), circuitry associated with single touch detection is applied to the outputs of the sensor lines in sensor 12 (block 222). According to some embodiments of the present invention, this connection is maintained for the duration of running application and user interaction e.g. finger, conductive object and stylus is detected (block 223). According to some embodiments of the present invention, simultaneous detection the different types of user interaction, e.g. finger, conductive object and stylus can be determined with the single-touch detection method.

In some exemplary embodiments, some pre-defined multi-touch gestures are detected using single touch detection. Details of exemplary methods for detecting multi-touch gestures using single touch detection may be found in U.S. patent application Ser. No. 12/265,819, filed on Nov. 8, 2008 which is incorporated by reference herein.

According to some embodiments of the present invention, in response to an indication that the application requires multi-touch functionality over the entire detection area, e.g. detection area defined by the application (block 230), circuitry associated with multi-touch detection is applied to the outputs to sensor lines in sensor 12 (block 232). According to some embodiments of the present invention, this connection is maintained for the duration of running application and user interaction e.g. finger, conductive object is detected (block 235). According to some embodiments of the present invention, stylus interaction is also detected.

According to some embodiments of the present invention, in response to an indication that the application requires multi-touch in only a portion of the detection area, combined single and multi-touch detection is implemented (block 240). According to some embodiments of the present invention, for combined detection, the application specifies to digital unit 20 the size and position of the area(s) that requires multi-touch functionality (block 242). Optionally, the application also defines the resolution required for the multi-touch detection area. Optionally, the application also defines the update rate required for the multi-touch detection area.

According to some embodiments of the present invention, during a triggering and/or sampling cycle requiring detection of both single and multi-touch areas, circuitry corresponding to a particular detection method is applied to outputs of conductive lines assigned to a particular area (block 244) and interaction based on each detection method is detected in turn (block 245). In some exemplary embodiments, if the different areas include mutually exclusive conductive lines, application of dedicated circuitry occurs substantially simultaneously. In some exemplary embodiments, when different signal frequencies are used to trigger different detection areas, triggering periods for single and multi-touch detection partially overlap.

According to some embodiments of the present invention, a multi-touch detection area may be dynamically turned off, e.g. switched to a single touch detection area, when multi-touch functionality is not required for a specific task, function or application. According to some embodiments of the present invention, a multi-touch detection area may be switched to a single touch detection area in response to a user altering functionality offered in specific area of the touch detection screen. For example, in response to a user selecting a writing pad to be displayed in area 502 (FIG. 8B) in place of the virtual keyboard, area 502 can be switched to a single touch detection area. According to some embodiments of the present invention, the areas defined for multi-touch detection are dynamically defined during the course of the application running and changes are reported by host 22 to digital unit 20.

Figure 11A:
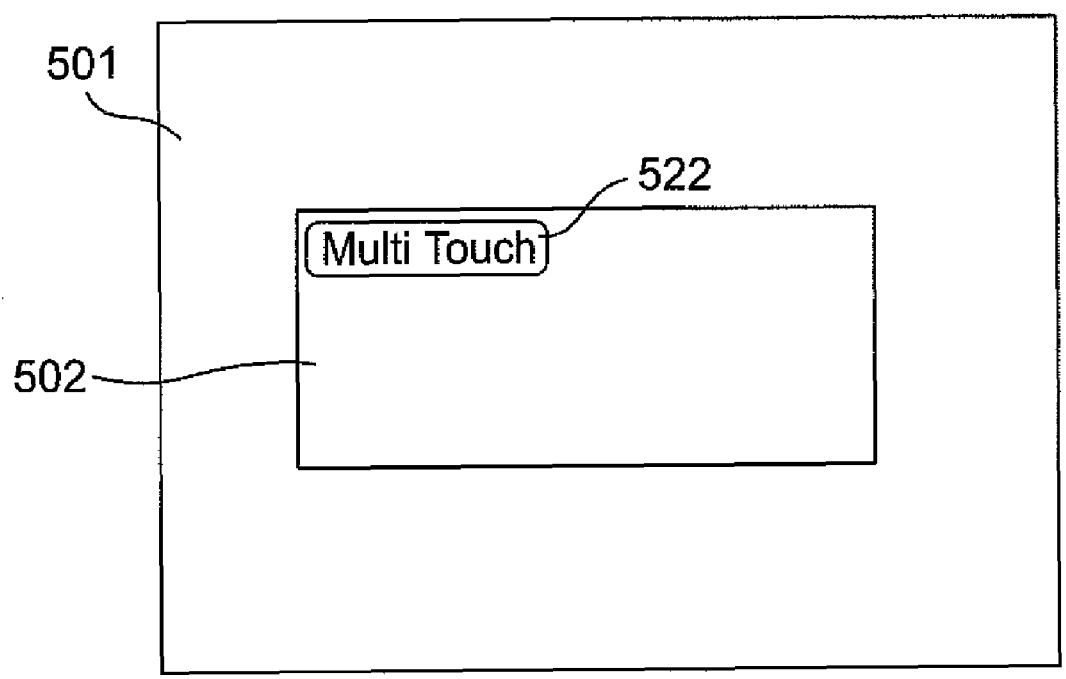
FIGS. 11A and 11B are schematic illustrations of a touch screen including a pre-defined area that can be changeably designated for one of single touch or multi-touch detection in accordance with some embodiments of the present invention.
Figure 11B:
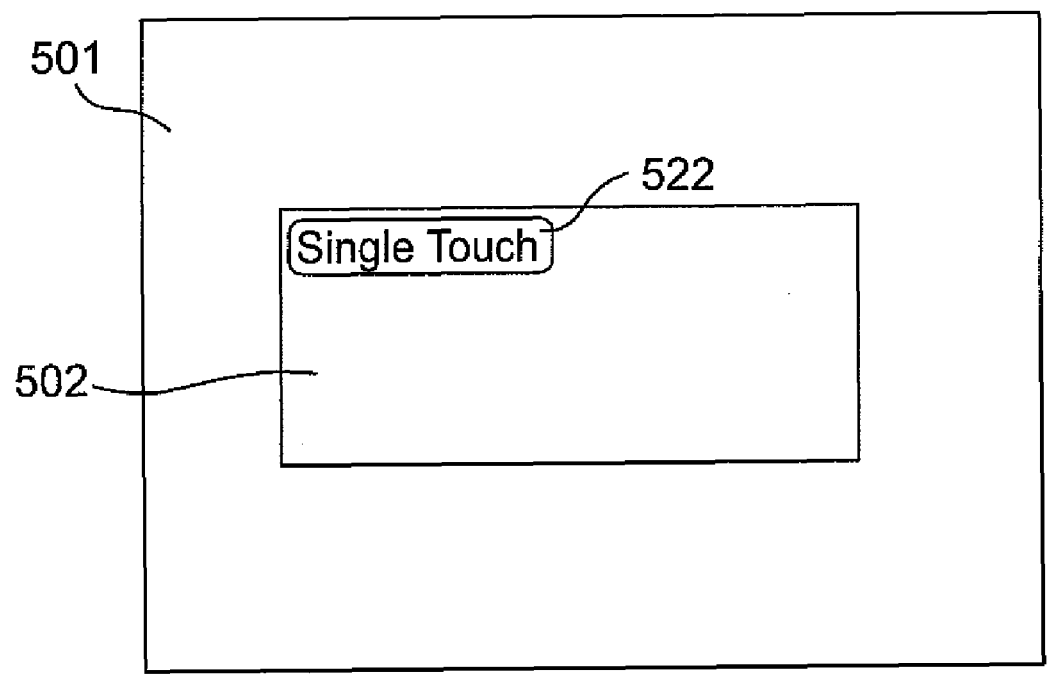

Reference is now made to FIGS. 11A and 11B schematically illustrating a touch screen including a pre-defined area that can be changeably designated for single touch and multi-touch detection in accordance with some embodiments of the present invention. According to some embodiments of the present invention, visual indication is provided so that the user can differentiate between areas providing multi-touch detection and areas providing single touch detection. In some exemplary embodiments, indication is in the form of a boarder around each pre-defined areas. In some exemplary embodiments, the borders and/or background within the area of the border is patterned and colored to indicate one of single or multi-touch detection. In some exemplary embodiments, a pre-defined area is labeled, e.g. label 522, to indicate the detection method applied in a specific area. According to some embodiments of the present invention, the pre-defined areas and the detection methods applied to these areas can be dynamically controlled based on user initiated or based on application initiated command. In some exemplary embodiments, area 502 may be toggled between single touch detection and multi-touch detection as required by the application software running on the host.

Figure 12A:
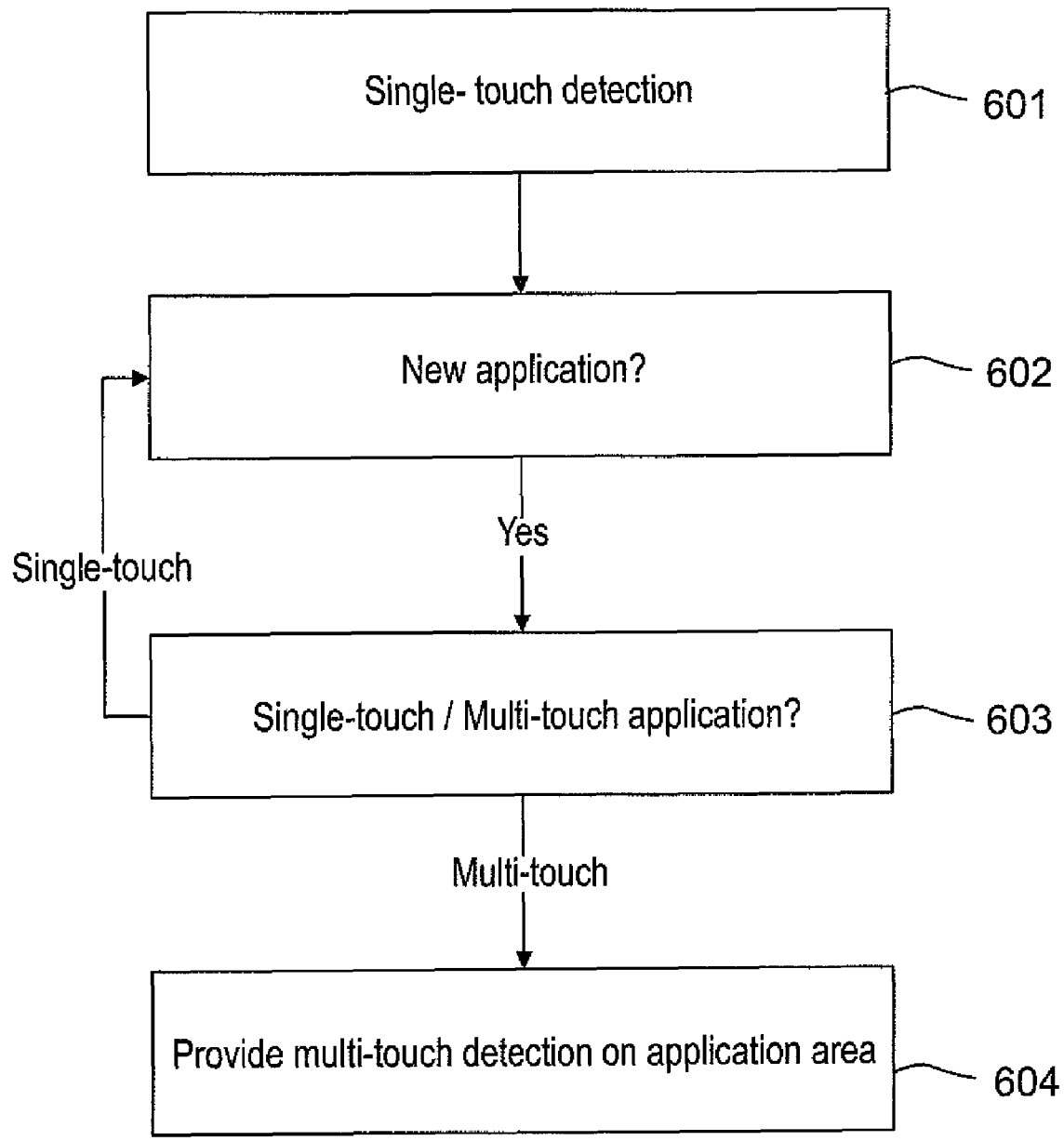
FIGS. 12A and 12B are exemplary flow charts describing a method for alternating between single touch detection and multi-touch detection in accordance with some embodiments of the present invention.
Figure 12B:
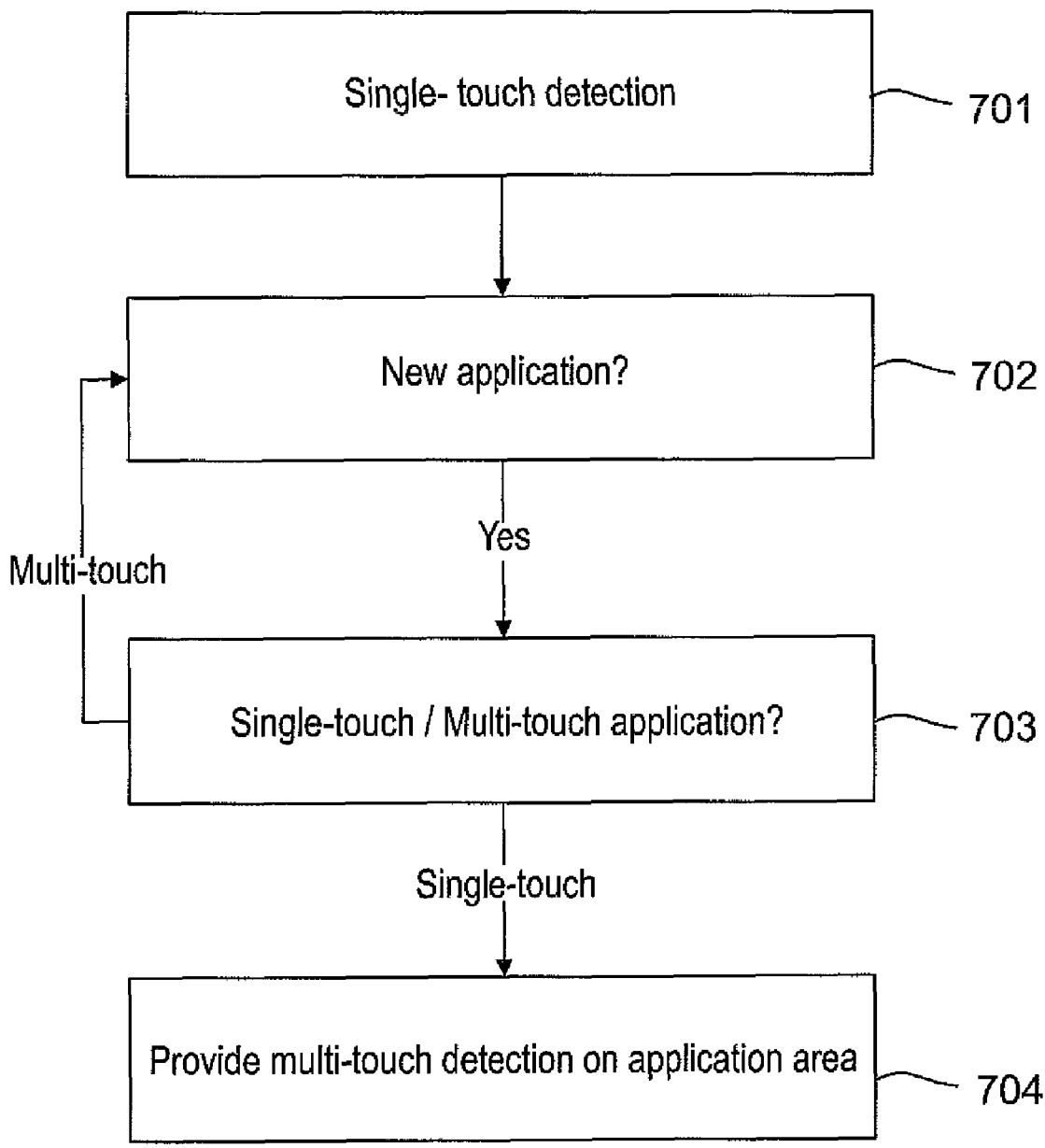

Reference is now made to FIGS. 12A and 12B showing exemplary flow charts describing a method for alternating between single touch detection and multi-touch detection in accordance with some embodiments of the present invention. Referring now to FIG. 12A, according to some embodiments of the present invention, a single-touch detection method is defined as the default touch detection provided on the display screen (block 601). Optionally, the single touch detection method corresponds to the single touch detection method described in reference to FIGS. 2 and 3. A query is made to determine if a new application was initiated (block 602).

Typically, a new application is initiated by the user. If a new application was initiated, a query is made to determine if the new application is a single-touch application, i.e. application that requires single-touch detection, or a multi-touch application, i.e. application that requires multi-touch detection (block 603). An exemplary multi-touch application is a virtual keyboard application. An exemplary single-touch application is application that requires button selection. In exemplary embodiments, multi-touch applications and/or single-touch applications are user defined. In exemplary embodiments, multi-touch applications and/or single-touch applications are defined by the operating system. Optionally, the host computer request multi-touch capability from the digitizer system. Optionally, the host computer request single-touch capability from the digitizer system. In exemplary embodiments, multi-touch applications and/or single-touch applications are defined by the digitizer system.

If the new application is a single-touch application, the algorithm returns to block 602. According to some embodiments of the present invention, if the new application is a multi-touch application, the area corresponding to the multi-touch application is provided with multi-touch detection method (block 604). Typically, the area has a rectangular shape. Optionally, touch detection method described in reference to FIGS. 4A, 4B, and 4C is used as multi-touch detection method.

Referring now to FIG. 12B, according to some embodiments of the present invention, a multi-touch detection method is defined as the default touch detection provided on the display screen. According to some embodiments of the present invention, the system is operative for multi-touch detection (block 701). Optionally, the multi-touch detection method described in reference to FIGS. 4A-4C is used as multi-touch detection method.

A query is made to application and/or operating system to determine if a new application was initiated (block 702). Typically, a new application is initiated by the user. If a new application was initiated, a query is made to application and/or operating system to determine if the new application is a single-touch application, e.g. an application that requires single-touch detection, or a multi-touch application, e.g. application that requires multi-touch detection (block 703). If the new application is a multi-touch application, the algorithm returns to block 702. According to some embodiments of the present invention, if the new application is a single-touch application, the area corresponding to the single-touch application is provided with single-touch detection method (block 704). Typically, the area has a rectangular shape. Optionally, the single touch detection method described in reference to FIGS. 2 and 3 is used.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

While several exemplary embodiments of the invention have been described in detail above, those skilled in the art will recognize other embodiments and variations which come within the scope of the invention. It is accordingly understood that the scope of the invention is not intended to be limited by the written description herein, but rather is to be given the full scope permitted by the following claims.

What is claimed is:

1. An input device comprising:
   a touch sensitive sensor operative to sense finger touch;
   a detection unit controllable to apply a single touch detection method over at least one area of the touch sensitive sensor and a multi-touch detection method over at least one other area of same touch sensitive sensor; and
   a controller operative to set the areas of single touch and multi-touch detection, wherein a refresh rate associated with the touch sensitive sensor is responsive of a size of the area where the multi-touch method is applied and wherein limiting size of the area where the multi-touch method is applied provides for increasing the refresh rate of the input device.

2. The input device according to claim 1, wherein the detection unit is operative to apply the multi-touch detection method over a plurality of different areas.

3. The input device according to claim 1, wherein the at least one other area detected based on the multi-touch detection method is sampled at a lower resolution than the at least one area detected based on the single touch detection method.

4. The input device according to claim 1, wherein during a single sampling cycle, the controller is operative to provide for first sampling the touch sensitive sensor based on the single touch detection method and subsequently sampling an area applied for multi-touch detection based on the multi-touch detection method.

5. The input device according to claim 1, wherein the touch sensitive sensor provides for detecting stylus input in an area from the at least one area set for single touch detection and the at least one other area set for multi-touch detection.

6. The input device according to claim 5, wherein the input device provides for sampling touch and stylus signals on the conductive lines substantially simultaneously.

7. The input device according to claim 1, wherein the different detection methods are associated with the detecting unit triggering or interrogating the touch sensitive sensor with different frequencies.

8. The input device according to claim 1, wherein the single touch and multi-touch areas area are sampled substantially simultaneously.

9. The input device according to claim 1, wherein at least one of the areas is dynamically defined.

10. The input device according to claim 1, wherein during a single sampling cycle, the controller is operative to sample at least a portion of the touch sensitive sensor based on the first touch detection method and subsequently sample at least another portion of the touch sensitive sensor based on the second touch detection method.

11. An input device comprising:
    a touch sensitive sensor operative to sense finger touch;
    a detection unit controllable to apply a single touch detection method over at least one area of the touch sensitive sensor and a multi-touch detection method over at least one other area of same touch sensitive sensor; and
    a controller operative to set the areas of single touch and multi-touch detection, wherein the controller is operative to provide for sampling output from a same conductive line over a first period based on the single touch detection method and over a second period based on the multi-touch detection method and wherein the detection unit is operative to switch to an alternate circuit path during the second sampling period.

12. The input device according to claim 11, wherein the controller is operative to dynamically set areas for detecting with the single touch detection method and for detecting with the multi-touch detection method.

13. The input device according to claim 12, wherein the controller sets the at least one area and the last least one other area based on requirements of an application running on a host associated with the touch sensitive sensor.

14. The input device according to claim 11, wherein a refresh rate associated with the touch sensitive sensor is responsive of a size of the area where the multi-touch method is applied and wherein limiting size of the area where the multi-touch method is applied provides for increasing the refresh rate of the input device.

15. The input device according to claim 11, wherein the touch sensitive sensor is formed with a plurality of conductive lines formed in a grid.

16. The input device according to claim 15, wherein at least one of the conductive lines spans at least two areas where different detection methods are applied.

17. The input device according to claim 16, wherein the controller is operative to provide for sampling output from a same conductive line over a first period based on the single touch detection method and over a second period based on the multi-touch detection method.

18. The input device according to claim 17, wherein the detection unit is operative to switch to an alternate circuit path during the second sampling period.

19. The input device according to claim 15 wherein the single touch detection method is based on detecting a difference signal between parallel conductive lines of the grid.

20. The input device according to claim 15, wherein the detection unit is operative to simultaneously trigger and sample the conductive lines over the single touch detection area.

21. The input device according to claim 15, wherein the detection unit is operative to sequentially trigger conductive lines along one axis of the grid over the multi-touch detection area.

22. The input device according to claim 21, wherein the detection unit is operative to sample conductive lines within the multi-touch detection area in response to each trigger.

23. The input device according to claim 15, wherein the controller is operative to provide for sampling every other conductive line in a multi-touch detection area over a first sampling cycle and to sample all lines not sampled in the first sampling cycle during a subsequent sampling cycle.

24. The input device according to claim 11, wherein the detection unit is operative to apply the multi-touch detection method over a plurality of different areas.

25. The input device according to claim 11, wherein during a single refresh cycle, the controller is operative to sample at least a portion of the touch sensitive sensor based on the first touch detection method and subsequently sample at least another portion of the touch sensitive sensor based on the second touch detection method.

26. An input device comprising:
a touch sensitive sensor operative to sense finger touch, wherein the touch sensitive sensor is formed with a plurality of conductive lines formed in a grid;
a detection unit controllable to apply a single touch detection method over at least one area of the touch sensitive sensor and a multi-touch detection method over at least one other area of same touch sensitive sensor; and
a controller operative to set the areas of single touch and multi-touch detection, wherein the controller is operative to provide for sampling every other conductive line in a multi-touch detection area over a first sampling cycle and to sample all lines not sampled in the first sampling cycle during a subsequent sampling cycle.

* * * * *